(12) United States Patent
Diachina et al.

(10) Patent No.: US 9,137,819 B2
(45) Date of Patent: Sep. 15, 2015

(54) CELL UPDATE FOR OPTIMIZED SYSTEM ACCESS PROCEDURES BETWEEN BASE STATION SUBSYSTEMS AND MOBILE STATIONS

(71) Applicant: TELEFONAKTIEBOLAGET L M ERICSSON (PUBL), Stockholm (SE)

(72) Inventors: John Walter Diachina, Garner, NC (US); Paul Schliwa-Bertling, Ljungsbro (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 214 days.

(21) Appl. No.: 13/867,287

(22) Filed: Apr. 22, 2013

(65) Prior Publication Data
US 2013/0322403 A1    Dec. 5, 2013

Related U.S. Application Data

(60) Provisional application No. 61/653,112, filed on May 30, 2012.

(51) Int. Cl.
*H04W 72/12* (2009.01)
*H04W 36/00* (2009.01)
*H04W 72/04* (2009.01)

(52) U.S. Cl.
CPC ...... *H04W 72/1273* (2013.01); *H04W 36/0005* (2013.01); *H04W 72/04* (2013.01); *H04W 72/0413* (2013.01)

(58) Field of Classification Search
CPC ............ H04W 72/1273; H04W 72/04; H04W 36/0005; H04W 72/0413
USPC ........... 370/310, 328, 329, 331; 455/436, 450
See application file for complete search history.

(56) References Cited

U.S. PATENT DOCUMENTS

| | | | |
|---|---|---|---|
| 7,447,181 | B1* | 11/2008 | Forssell ...................... 370/336 |
| 2004/0097267 | A1 | 5/2004 | Pecen et al. |
| 2005/0021770 | A1 | 1/2005 | Helm et al. |
| 2011/0200019 | A1* | 8/2011 | Manbo et al. ................ 370/336 |
| 2014/0162646 | A1* | 6/2014 | Lee et al. ................... 455/435.2 |

OTHER PUBLICATIONS

Ericsson, St-Ericsson, "Optimized System Access Procedure", 3GPP TSG-GERAN #54, GP-120623, Sanya, China, May 14-18, 2012.
Ericsson, St-Ericsson, "Detailed OSAP Signalling Procedures", 3GPP TSG-GERAN #54, GP-120624, Sanya, China, May 14-18, 2012.

* cited by examiner

*Primary Examiner* — Chi H Pham
*Assistant Examiner* — Weibin Huang

(57) ABSTRACT

One embodiment is directed to a method implemented by a mobile station for establishing a downlink temporary block flow (TBF) from a base station subsystem (BSS). Cell re-selection is performed while a READY timer of the mobile station has not expired. A cell update message that includes a radio link control (RLC) data block containing a remaining ready timer value indicating a remaining time of the READY timer, which has not expired, is sent to the BSS for use in determining when a mobile station supports the assignment of a TOI, sending an assigned TOI to that mobile station and establishing subsequent downlink TBFs using the assigned TOI instead of a legacy mobile station identity. Another related embodiment is directed to a method implemented by a BSS for establishing downlink TBFs to a plurality of mobile stations.

20 Claims, 14 Drawing Sheets

```
┌─────────────────────────────────────────────────────────┐
│ Receive a packet uplink ack/nack (PUAN) message from the │──── 600
│ BSS, the PUAN message containing the TOI and a temporary │
│     logical link identity for the mobile station         │
└─────────────────────────────────────────────────────────┘
```

*Figure 6*

```
┌─────────────────────────────────────────────────────────┐
│   Send an enhanced packet channel request on a random    │──── 700
│       access channel (RACH) to request system access     │
└─────────────────────────────────────────────────────────┘
                            │
                            ▼
┌─────────────────────────────────────────────────────────┐
│  Receive an enhanced immediate assignment (EIA) message  │──── 702
│       on an access grant channel (AGCH), the EIA message │
│         identifying a packet data channel (PDCH) resource│
└─────────────────────────────────────────────────────────┘
                            │
                            ▼
┌─────────────────────────────────────────────────────────┐
│ Receive an additional temporary block flow information (ATI)│──── 704
│    message on a packet associated control channel (PACCH)│
│                  using the PDCH resource                 │
└─────────────────────────────────────────────────────────┘
                            │
                            ▼
┌─────────────────────────────────────────────────────────┐
│   Receive an uplink state flag (USF) assigned to the mobile│──── 706
│                           station                         │
└─────────────────────────────────────────────────────────┘
                            │
                            ▼
┌─────────────────────────────────────────────────────────┐
│                  Send the cell update message            │──── 708
└─────────────────────────────────────────────────────────┘
```

*Figure 7*

```
┌─────────────────────────────────────────────────────────┐
│  Provide a special length indicator (LI) value in the RLC data│──── 800
│   block containing the cell update message to indicate to the│
│     BSS that the RLC data block contains the remaining READY│
│                        timer value                       │
└─────────────────────────────────────────────────────────┘
                            │
                            ▼
┌─────────────────────────────────────────────────────────┐
│  Provide the remaining READY timer value at a location in the│──── 802
│    RLC data block that immediately follows a location of the│
│                      special LI value                    │
└─────────────────────────────────────────────────────────┘
```

*Figure 8*

Broadcast system information (SI) to the plurality of mobile stations, where the SI includes an indication that the BSS is capable of assigning the TOI to the mobile station for use in establishing the downlink TBF — 1100

Figure 11

Receive an enhanced packet channel request on a random access channel (RACH) which requests system access for the mobile station — 1202

Send an enhanced immediate assignment (EIA) message on an access grant channel (AGCH), the EIA message identifying a packet data channel, PDCH, resource — 1204

Send an additional temporary block flow information (ATI) message on a packet associated control channel (PACCH) using the PDCH resource — 1206

Send an uplink state flag (USF) assigned to the mobile station, the cell update message being received responsive to the mobile station receiving the USF assigned to the mobile station — 1208

Figure 12

```
< Packet Uplink Ack/Nack message content > ::=
    < PAGE MODE : bit (2) >
    { 00 < UPLINK_TFI : bit (5) >
       { 0    -- Message escape
          {    < CHANNEL_CODING_COMMAND : bit (2) >
               < Ack/Nack Description : < Ack/Nack Description IE > >
               { 0 | 1      < CONTENTION_RESOLUTION_TLLI : bit (32) > }
               { 0 | 1      < Packet Timing Advance : < Packet Timing Advance IE > > }
               { 0 | 1      < Power Control Parameters : < Power Control Parameters IE > > }
               { 0 | 1      < Extension Bits : Extension Bits IE > }        -- sub-clause 12.26
                 0     -- The value '1' was allocated in an earlier version of the protocol and shall not be used
               {   null | 0 bit** = < no string >   -- Receiver backward compatible with earlier version
                   | 1                              -- Additions for R99
                  { 0 | 1 <Packet Extended Timing Advance : bit (2) > }
                  < TBF_EST : bit (1)>
                  {   null | 0 bit** = <no string>   -- Receiver backward compatible with earlier version
                      | 1                            -- Additions for Rel-5
                     { 0 | 1 < CONTENTION_RESOLUTION identifier extension : bit (4) > }
                     { 0 | 1 < RB Id : bit (5) > }
                     {  null | 0 bit** = < no string >   -- Receiver backward compatible with earlier version
                        | 1                             -- Additions for Rel-10
                        { 0 | 1                         -- DTR Information
                          < CI_DTR : bit (1) >
                          < TN_PDCH_pair_DTR : bit (3) >
                          < DTR Blks : bit (2) > }                                    /---- 1500
                     ┌ ─ ─ ─ ─ ─ ─ ─ ─ { null | 0 bit** = <no string>  -- Receiver backward compatible with earlier version ┐
                     │                   | 1                              -- Additions for Rel-12                          │
                     │                  { 0 | 1                                                                            │
                     │                    < TOI_Length : bit (2) >                                                         │
                     │                    < Temporary OSAP Identifier : bit (val(TOI_Length) + 9) } }                      │
                     └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                     < padding bits > } }
                                            ! < Non-distribution part error : bit (*) = < no string > > }
               }
          }
         | 1     -- Message escape bit used to define EGPRS message contents
          { 00
             {    < EGPRS Channel Coding Command : < EGPRS Modulation and Coding Scheme IE >>
                  < RESEGMENT : bit (1) >
                  < PRE_EMPTIVE_TRANSMISSION : bit (1) >
                  < PRR RETRANSMISSION REQUEST : bit (1) >
                  < ARAC RETRANSMISSION REQUEST : bit (1) >
                  { 0 | 1      < CONTENTION_RESOLUTION_TLLI : bit (32) > }
                  < TBF_EST : bit (1)>
                  { 0 | 1      < Packet Timing Advance : < Packet Timing Advance IE > > }
                  { 0 | 1      < Packet Extended Timing Advance : bit (2) > }
                  { 0 | 1      < Power Control Parameters : < Power Control Parameters IE > > }
                  { 0 | 1      < Extension Bits : Extension Bits IE > }       -- sub-clause 12.26
                  { < EGPRS Ack/Nack Description : < EGPRS Ack/Nack Description IE > >
               0    -- The value '1' was allocated in an earlier version of the protocol and shall not be used.
               }
               {    null | 0 bit** = <no string>   -- Receiver backward compatible with earlier version
                    | 1                            -- Additions for Rel-5
                   { 0 | 1 < CONTENTION_RESOLUTION identifier extension : bit (4) > }                /---- 1502
                   { 0 | 1 < RB Id : bit (5) > }
                   ┌ ─ ─ ─ ─ ─ ─ { null | 0 bit** = <no string>  -- Receiver backward compatible with earlier version ┐
                   │               | 1                              -- Additions for Rel-12                           │
                   │              { 0 | 1                                                                             │
                   │                < TOI_Length : bit (2) >                                                          │
                   │                < Temporary OSAP Identifier : bit (val(TOI_Length) + 9) } }                       │
                   └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                            < padding bits > } }
                                 ! < Non-distribution part error : bit (*) = < no string > > }
             ! < Message escape : { 01 | 10 | 11 } bit (*) = <no string> > } }   -- Extended for future changes
           ! < Address information part error : bit (*) = <no string> > }
  ! < Distribution part error : bit (*) = <no string> > ;
```

*Figure 15*

CELL UPDATE FOR OPTIMIZED SYSTEM ACCESS PROCEDURES BETWEEN BASE STATION SUBSYSTEMS AND MOBILE STATIONS

CLAIM OF PRIORITY

This application claims the benefit of U.S. Provisional Application Ser. No. 61/653,112 filed on May 30, 2012, the contents of is hereby incorporated by reference herein.

TECHNICAL FIELD

The present invention relates to methods and operation by base station subsystems (BSSs) and mobile stations (MSs) for improving downlink access grant procedures for establishing downlink Temporary Block Flows (TBFs) following cell updates by the MSs.

BACKGROUND

In the wireless telecommunications field it is anticipated that there will be an ever increasing Common Control Channel (CCCH) congestion problem due to the increase of small data transmissions (SDTs) and instant message transmissions (IMTs) as a result of the Machine-to-Machine (M2M) traffic and the frequent small packet transmissions which are going to be generated by mobile stations (e.g., smart phones). Various solutions to address the CCCH congestion problem and other problems are the subject of the present disclosure.

SUMMARY

Wireless system operators seek continued improvements to the radio resource utilization efficiency of systems and, relatedly, seek to increase the number of mobile stations that can be assigned to shared radio resources. Radio resource utilization efficiency may be improved by reducing the amount of signaling (control plane communications) required to support a set of assigned mobile stations.

One embodiment disclosed herein is directed to a method implemented by a mobile station for establishing a downlink temporary block flow (TBF) from a base station subsystem (BSS). Cell re-selection is performed while a ready timer of the mobile station has not expired. A cell update message that includes a radio link control (RLC) data block containing a remaining ready timer value indicating a remaining time of the ready timer, which has not expired, is sent to the BSS for use in establishing subsequent downlink TBFs.

An advantage that may be provided by this method is that the BSS can respond to receipt of a RLC data block by starting a temporary OSAP identity timer (TOIT) having a timer value that is set based on the remaining ready timer value. Then, when the BSS receives a packet data unit (PDU) for downlink transmission to the mobile station, the BSS can determine from the TOIT whether a temporary optimized system access procedure identity (TOI) can be used when establishing a downlink TBF to the mobile station. More particularly, if the TOIT has not expired the BSS determines that the downlink TBF required for sending the PDU can be established to the mobile station using the TOI. In contrast, if the TOIT has expired the BSS determines that it must use the temporary logical link identity (TLLI) or some other legacy mobile station identity to establish the downlink TBF required for sending the PDU to the mobile station. The method may thereby reduce the volume of control plane message transmissions that are needed to manage the mobile station and, thereby, improve radio resource utilization efficiency.

Another related embodiment disclosed herein is directed to a method implemented by a BSS for establishing downlink TBFs to a plurality of mobile stations. A cell update message is received from the mobile station. The cell update message includes a RLC data block containing a remaining ready timer value indicating a remaining time of a READY timer of the mobile station that is in idle mode wherein the READY timer is a legacy timer known and maintained by both the mobile station and the SGSN. Responsive to receiving the cell update message comprising the payload of the RLC data block containing a non-zero value for the remaining ready timer, a temporary optimized system access procedure identity (TOI) is assigned to the mobile station for use in establishing subsequent downlink TBFs. The TOI is sent to the mobile station and a corresponding TOIT is started that has a timer value that is set based on the remaining ready timer value. The mobile station is released to cause it to enter Idle mode. Responsive to data being ready for download to the mobile station and the TOIT having not yet expired, subsequent downlink TBFs to the mobile station are established using the TOI assigned to the mobile station.

Other methods, BSSs, and mobile stations according to embodiments of the invention will be or become apparent to one with skill in the art upon review of the following drawings and detailed description. It is intended that all such additional methods, BSSs, and mobile stations be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 3-8 are flowcharts of operations and methods implemented by a mobile station for use in establishing a downlink TBF from a BSS;

FIGS. 9-14 are flowcharts of operations and methods implemented by a BSS for use is establishing downlink TBFs to a plurality of mobile stations;

FIG. 15 illustrates a modified packet uplink Ack/Nack (PUAN) message that is configured according to some embodiments;

DETAILED DESCRIPTION

Abbreviations

Figure 1:
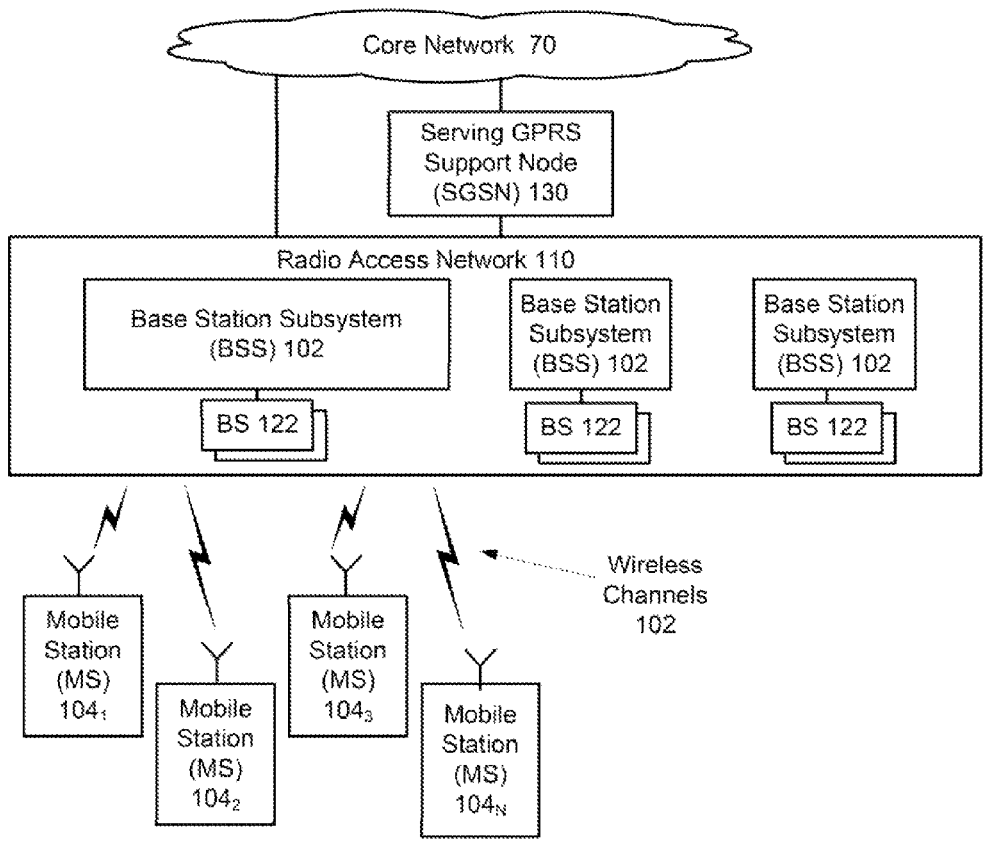
FIG. 1 is a block diagram of a cellular radio communications system that is configured according to some embodiments.

The following abbreviations are herewith defined, at least some of which are referred to within the following description of the present invention.
AGCH Access Grant Channel
ARFCN Absolute Radio Frequency Channel Number
ATI Additional TBF Information
BCCH Broadcast Control Channel
BSS Base Station Subsystem
CCCH Common Control Channel
CS Circuit Switched
DRX Discontinuous Reception
EGPRS Enhanced General Packet Radio Service
EPCR Enhanced Packet Channel Request
eTFI Enhanced Temporary Flow Identity
eUSF Enhanced Uplink State Flag
FN Frame Number
IA Incoming Access
IE Information Element
IMT Instant Message Transmission
LAP Low Access Priority
LLC Logical Link Control
MAC Media Access Control
MS Mobile Station
M2M Machine-to-Machine
OSAP Optimized System Access Procedure
PACCH Packet Associated Control Channel
PCH Paging Channel
PDU Packet Data Unit
PDCH Packet Data Channel
PFC Packet Flow Context
PFT Packet Flow Timer
PRR Packet Resource Request
PUA Packet Uplink Assignment
PUAN Packet Uplink Ack/Nack
RACH Random Access Channel
RF Radio Frequency
RLC Radio Link Control
SDT Small Data Transmission
SGSN Serving GPRS Support Node
SI System Information
TBF Temporary Block Flow
TCH Traffic Channel
TDMA Time Division Multiple Access
TLLI Temporary Logical Link Identity
TOI Temporary OSAP Identity
TOIT Temporary OSAP Identity Timer
TSC Training Sequence Code
USF Uplink State Flag Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. It is also noted that these embodiments are not mutually exclusive. Components from one embodiment may be tacitly assumed to be present/used in another embodiment.

When a mobile station (MS) starts sending an uplink Logical Link Control (LLC) Packet Data Unit (PDU) to a Serving GPRS Support Node (SGSN), the MS starts a READY timer. The SGSN also starts a READY timer when it receives the PDU from the MS.

Each time the MS $104_1$ sends another LLC PDU to the SGSN 130, within a time interval of the READY timers maintained by both the MS $104_1$ and the SGSN 130, the MS $104_1$ and the SGSN 130 each reset their respective READY timers.

For existing systems, in an operational mode where the MS has completed cell reselection and is in idle mode, and the SGSN has a PDU available for downlink transmission by the Base Station Subsystem (BSS) to the MS for which it determines the corresponding READY timer has expired, the SGSN instructs the BSS to first complete a paging process with the MS to determine where the MS is located on a cell specific basis. Following a successful paging process the SGSN knows the location of the MS at a cell level, starts a corresponding READY timer for that MS and sends the available PDU to the BSS for transmission to the MS wherein a legacy MS identity is used when establishing the downlink TBF used for sending the PDU.

In sharp contrast, in accordance with at least some embodiments disclosed herein, when a MS has completed cell reselection and its READY timer that has not expired, the MS performs a cell update procedure wherein it sends a remaining ready timer value to the BSS. The BSS responds by starting a temporary OSAP identity timer (TOIT) having a timer value that is set based on the remaining ready timer value. Then, when the BSS receives a PDU for downlink transmission to the MS, the BSS can determine from the TOIT whether a downlink TBF can be established to the MS using a TOI. More particularly, if the TOIT has not yet expired, is still running, (e.g., has not reached a threshold value, has not decremented to zero, etc.) the BSS determines that the downlink TBF can be established to the MS using the TOI instead of a legacy identity which has a length that is substantially greater than that of the TOI. In contrast, if the TOIT has expired, is not still running (e.g., has reached the threshold value, has decremented to zero, etc.) the BSS determines that a legacy identity must be used to establish a downlink TBF to the MS.

In light of increasing CCCH congestion and other and other channel signaling congestion as a result of Machine-to-Machine (M2M) traffic and frequent small data transmissions (SDTs) generated by MSs 104, an enhanced procedure for PS domain triggered system access referred to as Optimized System Access Procedure (OSAP) is being developed. Embodiments of the present disclosure are described with regard to an OSAP enabled system. OSAP is described further below with regarding to two articles: 1) "Optimized System Access Procedure" 3GPP TSG-GERAN #54, GP-120623 (hereinafter "GP-120623"); and "Detailed OSAP Signalling Procedure" 3GPP TSG-GERAN #54, GP-120624 (hereinafter "GP-120624"), both of which were written by the present inventors and presented in Sanya, China, May 14-18, 2012.

OSAP involves the introduction of new signaling procedures for more efficiently establishing both uplink and downlink TBFs. The detailed signaling procedures associated with the OSAP feature used for establishing downlink TBFs involves the use of a Temporary OSAP Identity (TOI) which a BSS maintains for an OSAP capable MS in Idle mode while the READY timer has not expired. An MS for which a valid TOI exists can therefore be assigned a downlink TBF using its TOI and without first performing the paging procedure since the network knows the MS location at the cell level. The specific case where an OSAP capable MS with a valid TOI performs a cell update procedure is further explained herein.

FIG. 1 is a block diagram of a cellular radio communications system that is configured according to some embodiments. The present inventive concepts are not limited to the embodiments of FIG. 1, as they may be embodied generally in any type of wireless communication network.

Mobile stations (MSs) $104_1$, $104_2$, $104_3$ ... $104_n$ also referred to as user equipment nodes (UEs) and/or wireless terminals, communicate via a radio access network (RAN) 110 with one or more core networks 70. As used herein, a MS $104_1$ can include any device that communicates through wireless channels 102 with a communication network, and may include, but is not limited to, a mobile telephone ("cellular" telephone), laptop computer, tablet computer, desktop computer, game console, and/or a machine-type communications (MTC) device.

The RAN 110 covers a geographical area which is divided into cell areas, with each cell area being served by a BSS 102 which communicates through base stations (BSs) 122 via wireless channels 102 with the MSs 104. A MS $104_1$ communicating with a BSS 102, via a BS 122, transmits an access request over a random access channel when the MS $104_1$ has data for transmission to the BSS 102. Responsive to the access request, the BSS 102 transmits an assignment message identifying uplink resources that have been allocated for the MS uplink data transmission(s).

A SGSN 130 is responsible for the delivery of data packets from and to the MSs 104 within its geographical service area. Its tasks include packet routing and transfer, mobility management (attach/detach and location management such as triggering a paging procedure by one or more BSS to determine the current cell of an MS 104), logical link management, and authentication and charging functions. The location register of the SGSN 130 stores location information (e.g., current cell, current VLR) and user profiles (e.g., IMSI, address (es) used in the packet data network) of all MSs 104 registered with this SGSN 130.

Each time the MS $104_1$ sends another LLC PDU (i.e. containing uplink data payload) to the SGSN 130, the MS $104_1$ and the SGSN 130 each reset their respective READY timers. While the READY timer has not expired (is running), the SGSN 130 knows where the MS $104_1$ is located on a cell specific basis, so the SGSN 130 does not have to page the MS $104_1$ and wait for a response to find out where the MS $104_1$ is located before delivering downlink data to the MS $104_1$. After the MS $104_1$ has completed a cell reselection (e.g., due to a mobility event), the MS $104_1$ determines that its READY timer has not expired so the MS $104_1$ sends a cell update whereby it updates the SGSN 130 with the new cell where the MS $104_1$ is now located so that the SGSN can continue to send downlink data on a cell specific basis without having to first page the MS $104_1$.

Figure 2:
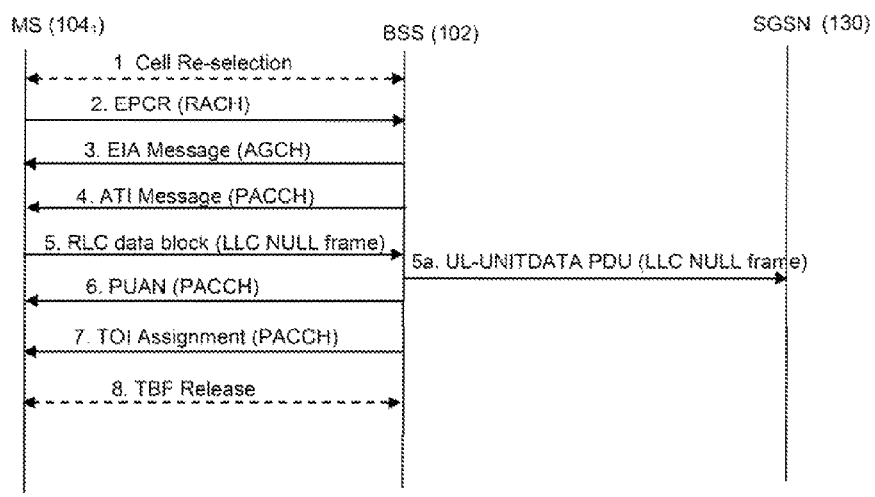
FIG. 2 is a data flow diagram of cell update for optimized system access procedures between a base station subsystem and a mobile station according to some embodiments.

In accordance with embodiments disclosed herein, when an OSAP capable MS $104_1$ (and/or the other MSs $104_2$, $104_3$ ... $104_n$) is in Idle mode and has a READY timer that has not expired, and a valid TOI is presently assigned to the MS, that MS 104 can be assigned a downlink TBF using its assigned TOI and without first performing a paging procedure because the BSS 102 knows the MS location at the cell level. Methods and operations that can be performed to establish a downlink TBF from the BSS 102 to the MS $104_1$ are explained below with reference to FIGS. 1, 2, and 15. FIG. 2 is a data flow diagram of cell update for optimized system access procedures between the BSS 102 and the MS $104_1$ according to some embodiments. FIG. 15 illustrates a modified packet uplink Ack/Nack (PUAN) message that is configured according to some embodiments.

The basic signaling events triggered when an OSAP capable MS $104_1$ in the Ready state performs cell re-selection are shown in FIG. 2.

In step 1 of FIG. 2, an OSAP capable MS $104_1$ performs a cell re-selection at any time while its READY timer has not expired (is running).

In step 2 of FIG. 2, since the READY timer of the MS $104_1$ has not expired, is running (e.g., has not yet reached a threshold value, decremented to zero, etc.) the MS $104_1$ has to contact the SGSN 130 of the new cell to inform the SGSN 130 where the MS $104_1$ is located. Thus, after reading the necessary System Information (which can be performed as per a legacy operation) the MS $104_1$ attempts system access by sending an Enhanced Packet Channel Request on the RACH indicating (for example) "OSAP Request—One Phase Access".

In step 3 of FIG. 2, the MS $104_1$ detects an Enhanced Immediate Assignment (EIA) message with matching "FN Information" and "Random Bits" information and then moves to the indicated Packet Data Channel (PDCH) resources where it waits for a matching Additional TBF Information (ATI) message.

In step 4 of FIG. 2, the MS $104_1$ detects an Additional ATI message with matching "Message Reference ID" and "MS Assignment Bitmap" information and then continues with contention resolution.

In one embodiment, the BSS 102 broadcasts (step 2 of FIG. 2) system information (SI) to the plurality of MSs 104, where the SI includes an indication that the BSS 102 supports OSAP and is capable of assigning the TOI to the mobile stations 104 for use in establishing the downlink TBF. The MS $104_1$ can therefore determine from the SI whether the BSS 102 is capable of assigning a TOI to the MS $104_1$ for establishing the downlink TBF. The MS $104_1$ can selectively perform step 5 of FIG. 2, explained below to send the cell update message comprising a RLC data block containing the remaining ready timer value to the BSS 102, in response to determining that the BSS 102 is capable of assigning a TOI to the MS $104_1$. In contrast, the MS can respond to determining from the SI that the BSS 102 is not capable of assigning a TOI to the MS $104_1$, by not including the remaining ready timer value in RLC data block containing the cell update message when performing step 5 of FIG. 2.

In step 5 of FIG. 2, upon receiving the first instance of its assigned USF the MS $104_1$ sends a cell update which consists of, or includes, an RLC data block containing an entire LLC NULL frame. The USF is used for dynamic allocation of uplink resources, while on a downlink PDCH, the value of which allows a defined MS to send a defined number of data blocks in the uplink direction using the uplink PDCH. In accordance with a present embodiment, the RLC data block also contains a special Length Indicator (LI) value as the first instance of LI in the RLC data block which is immediately followed by a "Remaining Ready Timer Value" octet (formatted as per the legacy GPRS Timer IE sent from the SGSN 130 to the BSS 102—see sub-clause 11.3.44 of TS 48.018):

Timer value: Bits 5 to 1 represent the binary coded timer value (where '000' indicates 1 timer value unit)
Unit value: Bits 6 to 8 defines the timer value units as follows:
Bits
8 7 6
0 0 0    value is incremented in multiples of 2 s
0 0 1    value is incremented in multiples of 1 minute

| | |
|---|---|
| 0 1 0 | value is incremented in multiples of decihours |
| 0 1 1 | value is incremented in multiples of 500 msec |
| 1 1 1 | value indicates that the timer does not expire. |
| | Other values shall be interpreted as multiples of 1 minute in this version of the protocol. |

The use of a special LI value indicating the presence of an octet containing "Remaining Ready Timer Value" information can be realized in a manner very similar to that used for the "Enhanced Multiplexing for Single RLC Entity (EMSR)" feature. For example, the first instance of LI in the RLC data block can be a special (new) LI that indicates the octet immediately following this special LI contains the "Remaining Ready Timer Value" octet (thereby indicating the MS $104_1$ is in the Ready state, its READY timer is running, and therefore needs a TOI to be allocated if OSAP is to be used for downlink TBF establishment while the MS $104_1$ remains in the Ready state).

Presence of the LI value in the cell update message therefore serves to inform the BSS 102 that the MS $104_1$ supports OSAP and is can therefore operate using a TOI, which the BSS 102 then assigns to the MS $104_1$. The LI value also indicates to the BSS 102 that the RLC data block contains the remaining ready timer value. The remaining ready timer value can be provided at a location in the cell update message that immediately follows a location of the special LI value.

The BSS 102 responds to the presence of this information by allocating the MS $104_1$ a Temporary OSAP Identity (TOI) and starting a TOI Timer (TOIT) according to the timer value indicated by the "Remaining Ready Timer Value" octet. Note that the "Remaining Ready Timer Value" octet will indicate the remaining value of the READY timer applicable to the MS at the point where it sends the LLC NULL frame (also known as a cell update message).

The cell update is communicated through the BSS 102 to the SGSN 130 to inform the SGSN 130 of the cell specific location of the MS $104_1$. Upon receiving the cell update the SGSN 130 resets the READY timer corresponding to the MS $104_1$ from which it received the cell update message and then continues to let the Ready timer for the MS $104_1$ run, so that when any downlink data for the MS $104_1$ becomes available, the SGSN 130 knows which cell to address to send the downlink data to reach the MS $104_1$.

In step 5a of FIG. 2, the BSS 102 forwards the LLC NULL frame (cell update) to the SGSN 130 thereby allowing the SGSN 130 to direct future downlink payload to the correct BSS 102.

In step 6 of FIG. 2, the BSS 102 confirms reception of the RLC data block by sending the MS $104_1$ a Packet Uplink Ack/Nack (PUAN) that includes Temporary Logical Link Identity (TLLI) thereby allowing contention resolution to be completed from the MS $104_1$ perspective (i.e. as per legacy one phase contention resolution).

In step 7 of FIG. 2, the BSS 102 uses PACCH signaling to send the allocated TOI to the MS $104_1$ and the BSS 102 considers this TOI to be valid for as long as the corresponding TOIT has not expired (is running). As an alternative to sending the MS $104_1$ this separate PACCH signaling message in step 7, the PUAN message sent in step 6 of FIG. 2 above can be modified to include the allocated TOI and thereby eliminate this step (i.e. step 7 of FIG. 2). FIG. 15 illustrates a modified packet uplink Ack/Nack (PUAN) message that is configured according to some embodiments. The PUAN message of FIG. 15 has been modified from a conventional message to add a TOI assignment for the MS $104_1$ in information elements 1500 and 1502 for TOI length and temporary OSAP identifier.

A shorter TOI (e.g., 10-12 bits long) may be assigned to the MS $104_1$ for use in download transmissions, instead of assigning longer TOI identity to the MS $104_1$. Use of a shorter identity allows downlink assignment messages for downlink TBF resource assignment establishment to be sent to an increased plurality of the MSs 104 in a single access grant channel message compared to using legacy MS identity values in downlink assignment messages sent on the AGCH. In other words, using TOI as the MS identity allows a single access grant channel message can address an increased plurality of the MSs 104, which improves capacity of the access grant channel (i.e., the maximum number of MSs 104 that can share access grant channel).

While the MS $104_1$ is in Idle mode with the assigned TOI, the SGSN 130 can send subsequent downlink data, which becomes available for the MS $104_1$, to the BSS 102. In response to the BSS 102 determining that the corresponding TOIT has not expired (is still running), the BSS 102 can establish a downlink TBF with the MS $104_1$ (send an access grant channel (AGCH) message) using TOI and then transmit the data to the MS $104_1$ thereon without first performing a paging process. In contrast, when the BSS 102 determines that the TOIT has expired (is not running), the TOI which was assigned to the MS $104_1$ is no longer valid and the BSS 102 establishes a downlink TBF with the MS $104_1$ (send an access grant channel (AGCH) message) using a legacy MS identity wherein the legacy MS identity is substantially longer than the length of a TOI resulting in fewer MS 104 that can be addressed within a single assignment message sent on the AGCH.

The BSS 102 may send a single AGCH message that includes TOIs for a plurality of MSs 104 for which downlink data is ready for transmission. In this manner, data transfer for the plurality of MSs 104 can be efficiently performed using a single AGCH message that is addressed to the plurality of MSs 104, which can increase the capacity of the AGCH (i.e., increase the number of MSs 104 serviced by the AGCH).

In step 8 of FIG. 2, the uplink TBF is released according to legacy TBF release procedures.

It is noted that if a two phase access is used when an OSAP capable MS $104_1$ sends a cell update then the Packet Resource Request (PRR) message sent on the uplink PACCH (i.e. after the MS $104_1$ has successfully received its matching ATI message) can be modified (extended) to include the "Remaining Ready Timer Value" octet and the Pack Uplink Assignment (PUA) message sent on the downlink PACCH can be modified (extended) to include the allocated TOI for that MS $104_1$.

Accordingly, an OSAP capable MS $104_1$ in the Idle state can be assigned a TOI where the TOI remains valid for as long as the READY timer has not expired (is running). For the case of cell re-selection where a cell update becomes necessary, a mechanism (process) has been described in the context of FIG. 2 for allowing a MS $104_1$ to inform the BSS 102 of the time remaining for the MS's $104_1$ READY timer and for the BSS 102 to assign the MS $104_1$ a new TOI value and start a corresponding TOI Timer (TOIT) set to a value that reflects the value of the time remaining for the MS's $104_1$ READY timer. Both these of these mechanisms may be beneficial to providing increased AGCH capacity for the case of OSAP based downlink TBF establishment which can be triggered at any time after a cell re-selection.

Although embodiments have been described in the context of the system of FIG. 1 and the methods and operations of FIG. 2, the invention is not limited thereto. For example, some other embodiments may utilize fewer and/or different method and operational steps. Other such methods and operations that can be performed to establish a downlink TBF from the BSS 102 to the MS $104_1$ are explained below with reference to FIGS. 3-14. FIGS. 3-8 are flowcharts of operations and methods implemented by the MS $104_1$ for establishing a downlink TBF from the BSS 102. FIGS. 9-14 are flowcharts of operations and methods implemented by the BSS 102 for establishing downlink TBFs to the MS 104₁ and other MSs 104.

Figure 3:
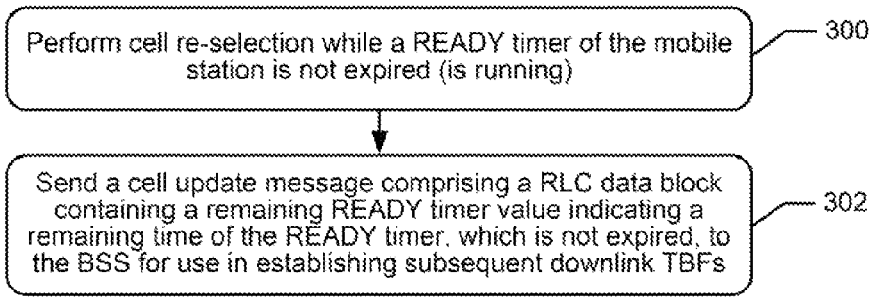

The method and operations of FIG. 3 are implemented by a MS 104₁ to establish a downlink TBF from a BSS 102. Cell re-selection is performed (block 300) while a READY timer of the MS 104₁ has not expired (is running). A cell update message is sent (block 302) that includes a RLC data block containing a remaining ready timer value indicating a remaining time of the READY timer, which is not expired (is running), to the BSS 102 for use in establishing subsequent downlink TBFs and results in the MS 104₁ restarting its READY timer.

Figure 4:
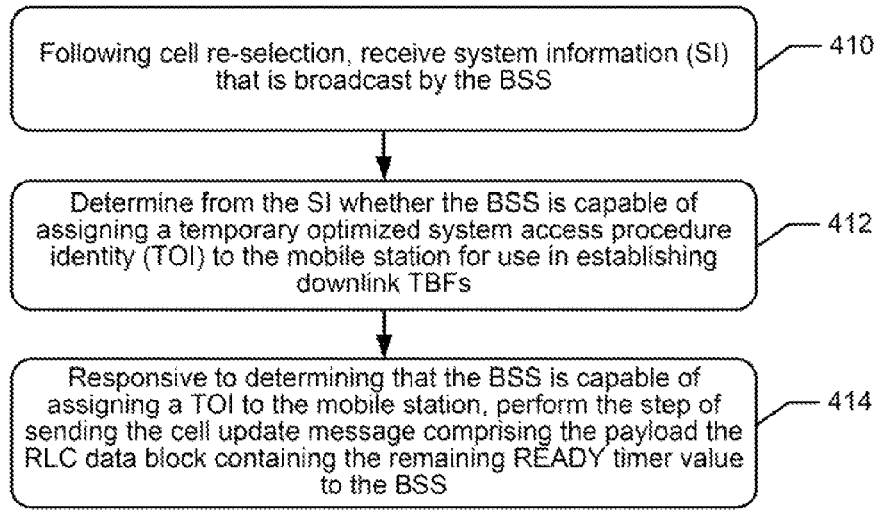

In the further optional embodiment of FIG. 4, following the cell re-selection (block 300), system information (SI) broadcast by the BSS 102 is received by the MS 104₁. A determination (block 412) is made from the SI whether the BSS 102 is capable of assigning a TOI to the MS 104₁ for use in establishing downlink TBFs. The step of sending (block 302 of FIG. 3) the cell update message comprising the payload of the RLC data block containing the remaining ready timer value to the BSS 102, is performed (block 414) in response to determining that the BSS 102 is capable of assigning a TOI to the MS 104₁ and results in the MS 104₁ restarting its READY timer.

Figure 5:
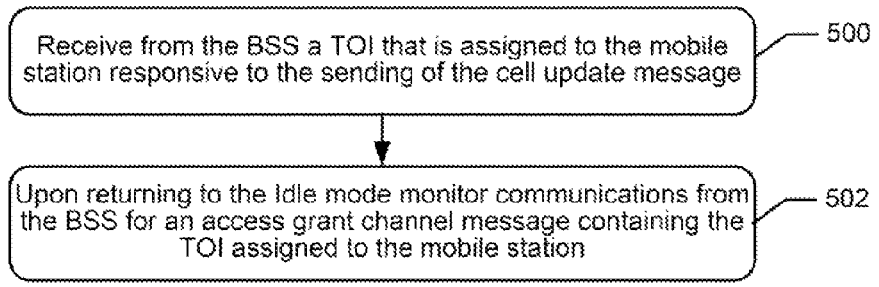

In the further optional embodiment of FIG. 5, the MS 104₁ receives (block 500) a TOI that is assigned to the MS 104₁ responsive to the sending of the cell update message. The TOI may be received by the mobile station 104₁ by packet associated control channel (PACCH) signaling. Upon returning to Idle mode communications from the BSS 102 are monitored (block 502) for an AGCH message containing the TOI assigned to the MS 104₁

In the further optional embodiment of FIG. 6, the MS 104₁ may receive (block 600) a PUAN message from the BSS 102, where the PUAN message contains the TOI and a temporary logical link identity for the MS 104₁.

In the further optional embodiment of FIG. 7, an enhanced packet channel request (EPCR) is sent (block 700) on a RACH to request system access. An EIA message is received (block 702) on an access grant channel, AGCH, the EIA message identifying a packet data channel, PDCH, resource. An ATI message is received (block 704) on a PACCH using the PDCH resource. An uplink state flag (USF) assigned to the MS 104₁ is received (block 706). The cell update message is then sent (block 708) and results in the MS 104₁ restarting its READY timer.

In the further optional embodiment of FIG. 8, a special LI value is provided (block 800) in the RLC data block containing the cell update message to indicate to the BSS 102 that the RLC data block contains the remaining ready timer value. A remaining ready timer value is provided (block 802) at a location in the cell update message that immediately follows a location of the special LI value.

The remaining ready timer value may be provided in the RLC data block as one group of binary coded bits representing the remaining time units of the READY timer and another group of bits defining a time unit applicable to the remaining time units of the READY timer. The remaining ready timer value of the RLC data block may be 8 bits long (an octect), with 6 binary coded bits representing the remaining time of the ready timer and 2 additional bits defining the time unit by which the remaining time of the ready timer is periodically incremented.

Figure 9:
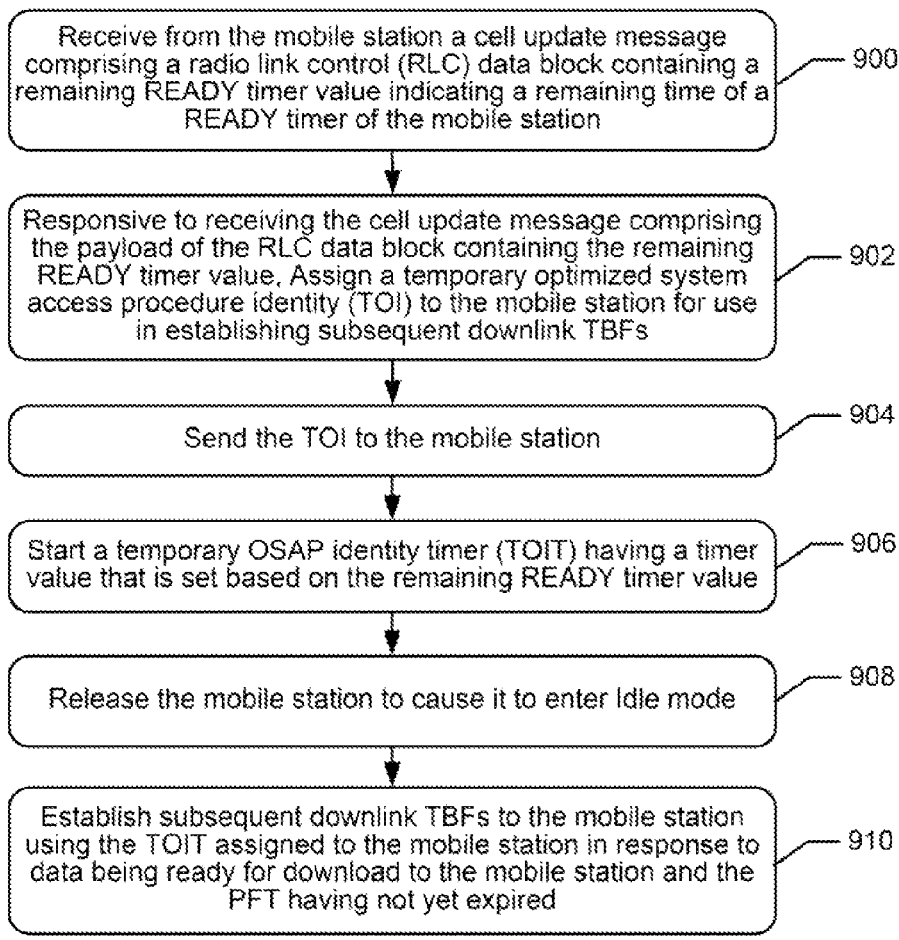

Some other embodiments are directed to methods implemented by a BSS 102 for establishing downlink TBFs to a plurality of MSs (104₁, 104₂, 104₃, . . . 104ₙ). FIGS. 9-14 are flowcharts of operations and methods implemented by an example BSS 102. Referring to FIG. 9, the method and operations include receiving (block 900) from the mobile station 104₁ a cell update message that includes a RLC data block containing a remaining ready timer value indicating a remaining time of a READY timer of the mobile station 104₁. A TOI is assigned (block 902) to the mobile station 104₁ for use in establishing subsequent downlink TBFs, in response to receiving the cell update message that includes the RLC data block containing the remaining ready timer value. The TOI is sent (block 904) to the MS 104₁. A TOIT is started (block 906) that has a timer value that is set based on the remaining ready timer value. The MS 104₁ is released (block 908) to cause the MS 104₁ to enter Idle mode. Downlink TBFs are subsequently established (block 910) to the mobile station 104₁ using the TOI assigned to the mobile station 104₁ in response to data being ready for download to the mobile station 104₁ and the TOIT having not yet expired (is running).

Figure 10:
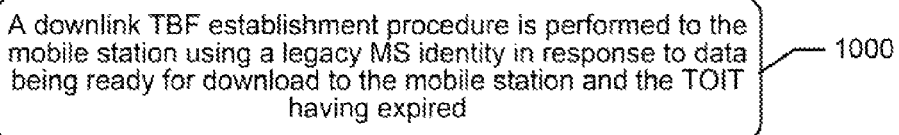

In the further embodiment of FIG. 10 a downlink TBF establishment procedure is performed (block 1000) to the mobile station 104₁ using a legacy MS identity in response to data being ready for download to the mobile station 104₁ and the TOIT having expired (is not running).

In the further embodiment of FIG. 11, system information (SI) is broadcast (block 1100) to the plurality of MSs (104₁, 104₂, 104₃, . . . 104ₙ). The SI includes an indication that the BSS 102 is capable of assigning the TOI to the mobile station 104₁ for use in establishing the downlink TBF.

The TOI assigned to the mobile station (104₁) can be sent (block 904) to the mobile station 104₁ using packet associated control channel (PACCH). Alternatively, the TOI assigned to the mobile station (104₁) can be included in a packet uplink Ack/Nack (PUAN) message that is sent (block 904) to the mobile station 104₁ to indicate receipt of the RLC data block containing the cell update message.

In the further embodiment of FIG. 12, the method and operations further include receiving (block 1202) an enhanced packet channel request on a RACH from the MS 104₁, which requests system access for the MS 104₁. An EIA message is sent (block 1204) on an AGCH to the MS 104₁. The EIA message identifies a PDCH resource. An additional temporary block flow information (ATI) message is sent (block 1206) to the MS 104₁ on a PACCH using the PDCH resource. An uplink state flag (USF) assigned to the mobile station (104₁) is sent (block 1208) to the MS 104₁. The cell update message is received from the MS 104₁ responsive to the MS 104₁ receiving the USF assigned to the MS 104₁.

Figure 13:
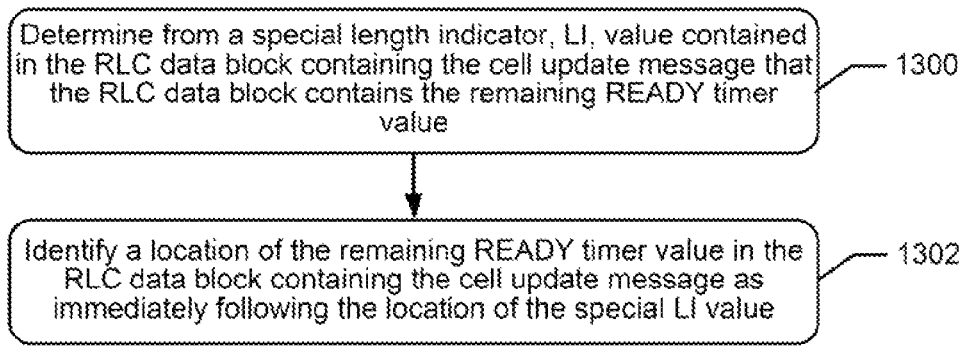

In the further embodiment of FIG. 13, a determination (block 1300) is made from a special LI value contained in the RLC data block containing the cell update message, that the RLC data block contains the remaining ready timer value. A location of the remaining ready timer value in the RLC data block containing the cell update message is identified (block 1302) as immediately following the location of the special LI value. Accordingly, the BS 102 uses the special LI value to determine that the RLC data block includes a remaining ready timer value and, furthermore, to determine a location of the ready remaining ready timer value.

The remaining ready timer value of the RLC data block made be binary coded bits representing the remaining time units of the READY timer and additional bits defining a time unit applicable to the remaining time units of the READY timer. In one embodiment, the remaining ready timer value of the RLC data block is 8 bits long, with 6 binary coded bits representing the remaining time units of the READY timer and 2 additional bits defining the time unit applicable to the remaining time units of the READY timer.

Figure 14:
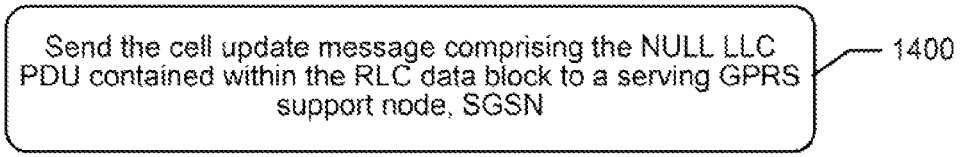

In the further embodiment of FIG. 14, the cell update message including the NULL LLC PDU RLC data block is sent (block 1400) to a SGSN 130. Accordingly, the SGSN 130 is informed of a location of the MS 104₁ on a cell specific basis and restarts the READY timer corresponding to the MS 104₁ sending the cell update message.

Figure 16:
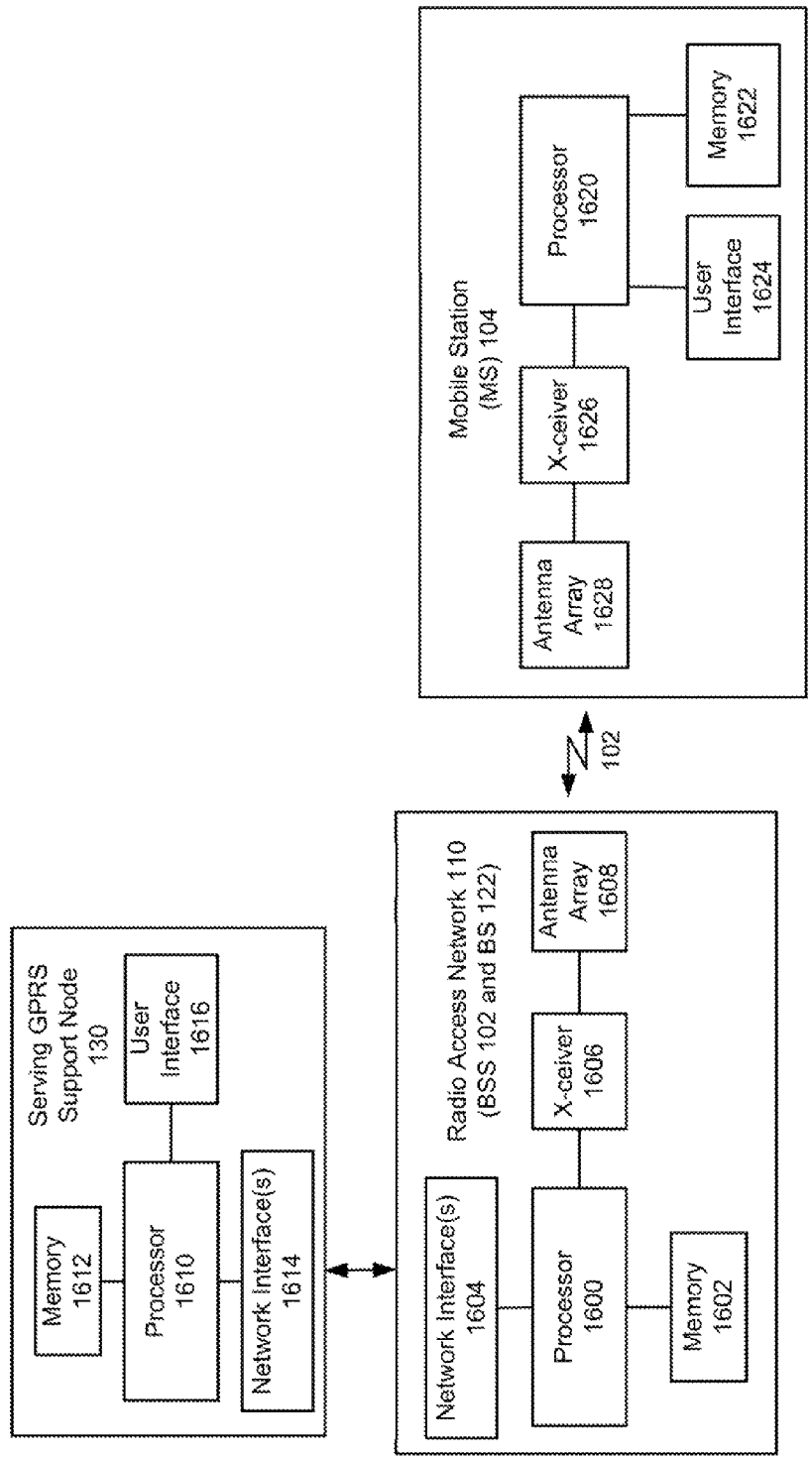
FIG. 16 is a block diagram illustrating a mobile station, a radio access network, and a Serving GPRS Support Node according to some embodiments.

FIG. 16 is a block diagram illustrating a MS 104, a radio access network (RAN) 110, and a SGSN 130 according to some embodiments. The MS 104 and the RAN 110 are configured to communicate over wireless channels 102 according to some embodiments. The MS 104 can include transceiver 1626 coupled between antenna array 1628 and processor 1620, and user interface 1624 coupled to processor 1620, and memory 1622 coupled to processor 1620. The MS 104 may also include a display device, an input interface (e.g., keyboard, touch sensitive display, keypad, voice recognition, etc.), and a speaker. The processor 1620 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1620 is configured to execute computer program instructions from the memory 1622, described below as a computer readable medium, to perform at least some of the operations and methods described herein as being performed by a MS.

The RAN 110 can include the BSS 102 and the BS 122. Although the BSS 102 and BS 122 are illustrated as sharing hardware resources within the RAN 110, in practice they would typically be physically separate devices (with separate hardware resources) that are communicatively networked together. The RAN 110 can include transceiver 1606 coupled between antenna array 1608 and processor 1600, a memory 1602 coupled to processor 1600, and a network interface 1604 coupled to the processor 1600. The RAN 110 may also include a display device, an input interface (e.g., keyboard, touch sensitive display, keypad, voice recognition, etc.), and a speaker. The processor 1600 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1600 is configured to execute computer program instructions from the memory 1602, described below as a computer readable medium, to perform at least some of the operations and methods described herein as being performed by the BSS 102 and/or the BS 122.

The SGSN 130 can include a network interface 1614 (which communicates with the network interface 1604 of the RAN 110), a memory 1612, and a user interface 1616 which may include a display device, an input interface (e.g., keyboard, touch sensitive display, keypad, voice recognition, etc.), and a speaker, which are collectively coupled to a processor 1610. The processor 1610 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1610 is configured to execute computer program instructions from the memory 1612, described below as a computer readable medium, to perform at least some of the operations and methods described herein as being performed by the SGSN 130.

The following detailed discussion describes various related embodiments. In particular, the following detailed discussion is based on an article prepared by the inventors entitled "Optimized System Access Procedure" 3GPP TSG-GERAN #54, GP-120623 and presented in Sanya, China, May 14-18, 2012.

"OSAP ASSISTED DOWNLINK TBF ESTABLISHMENT"

Abstract:

In light of increasing CCCH congestion problems anticipated as a result of M2M traffic and frequent small packet transmissions 130a and 130b generated by smart phones $104_1, 104_2, 104_3, 104_4 \ldots 104_n$ an enhanced procedure for PS domain triggered system access referred to as Optimized System Access Procedure (OSAP) is considered herein. The key objective of OSAP is to increase AGCH 106 capacity by minimizing the size of the MS specific information carried within AGCH based assignment messages 132. This can be accomplished by offloading the transmission of certain radio parameters 134 to system information 120, limiting the content 136 of the assignment messages 132 to what is strictly necessary to direct a MS $104_1$ to a packet resource and using the PACCH 140 of the packet resource to assign the MS $104_1$ any remaining information 134' and 136' it requires for uplink TBF 128 establishment. A detailed evaluation of OSAP shows that it can provide up to an eight-fold gain compared to legacy AGCH operation wherein a legacy Immediate Assignment message is assumed to assign packet resources for a single MS.

1. Introduction

Discussion of mechanisms for improving AGCH 106 capacity has been ongoing for a number of GERAN meetings with possible solutions as described in references [1] and [2]. A reasonable operational example to consider that provides motivation for the OSAP feature described herein is as follows:

The 51-multiframe format of a downlink CCCH could, for a given period of high system load, consist of an average of 4 PCH blocks and 5 AGCH blocks (i.e. in addition to the radio block used for BCCH Norm).

For a single instance of this 51-multiframe format there would be 51 RACH bursts resulting in a RACH burst to AGCH block ratio of about 10 to 1 (reduced to about 5 to 1 when factoring in the degradation of RACH performance due to collisions inherent to slotted aloha operation) which strongly suggests the AGCH will be a bottleneck.

Using IPA as a means to mitigate this imbalance results in achieving a 10 to 3 ratio (i.e. since IPA allows for up to 3 MS to be addressed by a single assignment message) but further mitigation of this imbalance is desirable if feasible (note: IPA is an alternative to OSAP and is discussed in reference [1] and later below).

For DL TBF establishment when a MS is in READY STATE, the IPA feature provides no performance increase as DL TBFs will always be established using the legacy Immediate Assignment message.

The OSAP features described herein allow for further reducing the RACH burst to AGCH block ratio as follows:

Allowing for the inclusion of Mobile Allocation information 134 as new system information (SI) 120 to identify the subset of ARFCNs defined by the Cell Allocation to be used when frequency hopping is used in a given cell. The Mobile Allocation information 134 included as SI 120 can be referred to as "Static Radio Parameters" (SRP) 134 and would apply to packet resources assigned to mobile stations $104_1, 104_2, 104_3, 104_4 \ldots 104_n$ using OSAP.

Limiting the content of AGCH based assignment messages 132 to what is strictly necessary to direct a mobile station $104_1$ to a packet resource where it waits for a downlink PACCH message 138.

Sending a PACCH message 138 on the downlink of the assigned packet resource to provide a MS $104_1$ with all additional information 134' and 136' needed to complete the establishment of either an uplink TBF 128 or downlink TBF.

Introducing a new AGCH message 132 referred to as an Enhanced Immediate Assignment (EIA) message 132 and a new PACCH message 138 referred to as an Additional TBF Information (ATI) message 138.

Figure 17A:
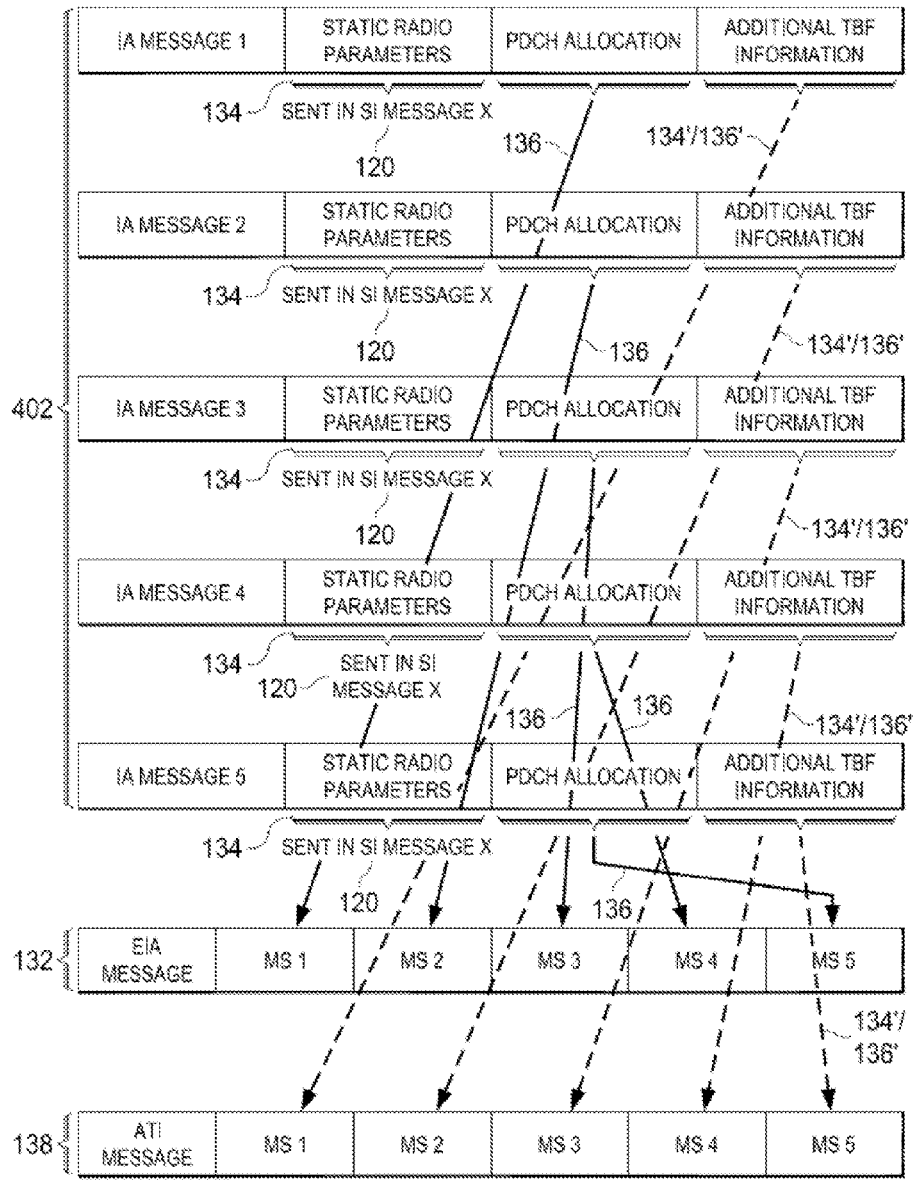
FIGS. 17a-d illustrate methods and operations by a mobile station and a BSS for optimized system access procedure according to some embodiments, and disclosed in an article prepared by the inventors entitled "Optimized System Access Procedure" 3GPP TSG-GERAN #54, GP-120623 and presented in Sanya, China, May 14-18, 2012.

FIG. 17a shows an example according to one embodiment for how the content of 5 legacy IA messages 402 can be effectively distributed within (a) system information 120, (b) a single EIA message 132 and (c) a single instance of an ATI message 138 (i.e. whereby a RACH burst to AGCH block ratio of 10 to 5 is realized). Additional analysis within this discussion paper shows that a single EIA message 132 can be used to address up to 8 different MSs $104_1, 104_2, 104_3, 104_4 \ldots 104_n$ thereby allowing for a 10 to 8 ratio to be realized using OSAP.

2. Optimized System Access Procedure—Overview

The SRP information 134 can be carried within SI 120 (e.g. using SI 21) (according to the first embodiment of the present invention). Or, the SI 120 will at minimum provide an indication 302 (according to the second embodiment of the present invention). In any case, the SI 120 indicates when a serving cell supports the Optimized System Access Procedure (OSAP) wherein the corresponding BSS 102 is capable of receiving a new RACH burst 124 that involves the use of a new training sequence code (TSC). The reception of an access request message 124 known as an Enhanced Packet Channel Request 124 (EPCR) sent using this new TSC allows for introducing new OSAP specific code points in the 11-bit EPCR message as per TABLE 1 below.

TABLE 1

ENHANCED PACKET CHANNEL REQUEST 124 MESSAGE CONTENT

```
< Enhanced Packet channel request message content > ::=
    < OSAP Request - one phase access :          00      < Priority : bit (2) >
                                                         < MultislotClassGroup : bit (3) >
                                                         < RandomBits : bit (4) > >
    < OSAP Request - signalling :                01000 < Priority : bit (2) >
                                                         < RandomBits : bit (4) > >
    < OSAP Request - single block packet access : 01001 < Priority : bit (2) >
                                                         < RandomBits : bit (4) > >
    < OSAP Request - two phase access :          01010 < Priority : bit (2) >
                                                         < RandomBits : bit (4) > >;
```

Figure 17B:
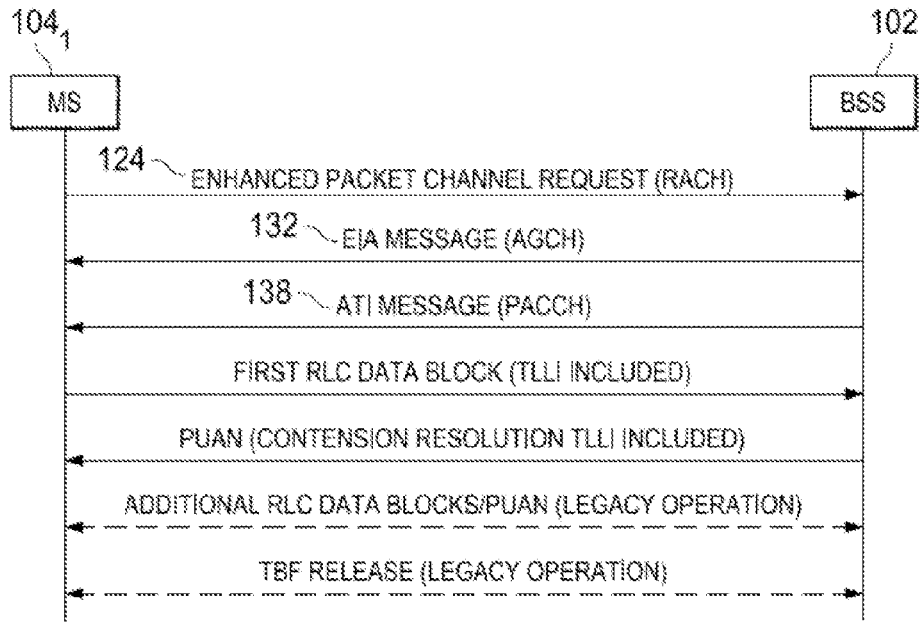

The basic signaling events associated with an OSAP based system access for uplink TBF 128 establishment wherein a one phase access is used are shown in FIG. 17b.

3. Analysis of the Legacy Immediate Assignment Message Content

The content of the legacy Immediate Assignment message is examined below on a per information element basis to identify which information must still be included within the OSAP specific EIA message 132 sent on the AGCH 106 and which information can be sent later using one or more OSAP specific ATI message 138 instances sent on the PACCH 140 (i.e. that supplements the packet resource information provided by the OSAP specific assignment message 132).

Page Mode: This content of this legacy IE is included within the Page Mode IE of the EIA message 132 shown in TABLE 4. This IE allows for informing a MS not addressed by the EIA message 132 about possible extended paging operation and is therefore not deferrable to an ATI message 124.

Dedicated mode or TBF: Not required since the system access scenario considered herein is always associated with TBF establishment.

Channel Description: Not required since it is associated with identifying a TCH.

Packet Channel Description: An enhanced version of this legacy IE is included within the Packet Channel Description IE of the EIA message 132 as shown in TABLE 4 (i.e. the enhanced version consists of the legacy IE with the Channel type field and the spare bits removed). This IE provides the basic amount of information required by a mobile station $104_1$ to identify the assigned packet resources and is therefore not deferrable to an ATI message 138.

Request Reference: An enhanced version of this legacy IE is included in the EIA message 132 where similar information is carried using the MS Specific EIA Parameters IE as shown in TABLE 4. This information is used for the purpose of contention resolution and is therefore not deferrable to an ATI message 138.

TABLE 2

Legacy IMMEDIATE ASSIGNMENT message content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | Immediate Assignment Message Type | Message Type 10.4 | M | V | 1 |
| | Page Mode | Page Mode 10.5.2.26 | M | V | ½ |
| | Dedicated mode or TBF | Dedicated mode or TBF 10.5.2.25b | M | V | ½ |
| | Channel Description | Channel Description 10.5.2.5 | C | V | 3 |
| | Packet Channel Description | Packet Channel Description 10.5.2.25a | C | V | 3 |
| | Request Reference | Request Reference 10.5.2.30 | M | V | 3 |
| | Timing Advance | Timing Advance 10.5.2.40 | M | V | 1 |
| | Mobile Allocation | Mobile Allocation 10.5.2.21 | M | LV | 1-9 |
| 7C | Starting Time | Starting Time 10.5.2.38 | O | TV | 3 |
| | IA Rest Octets | IA Rest Octets | M | V | 0-11 |

Timing Advance: Included in an ATI message 138 instance sent on the PACCH 140.

Mobile Allocation: Can be included in the SRP information 134 sent on BCCH 122 or included in the EIA message 132. If frequency hopping is applied, the mobile station $104_1$ uses the last Cell Allocation received on SI1 to decode the Mobile Allocation.

Starting Time: Included in an ATI message 138 instance sent on the PACCH 140.

IA Rest Octets: An enhanced version of this legacy IE is included in an ATI message 138 instance where similar information is carried using the MS Specific TBF Parameters IE as shown in TABLE 5 (i.e. the enhanced version of this legacy IE eliminates the CSN.1 extension mechanism used for indicating information on a per release basis).

4. SRP Information Content

The SRP information 134 can be carried within SI 120 (e.g. using SI 21) (according to the first embodiment of the present invention). Or, the SI 120 will at minimum provide an indication 302 (according to the second embodiment of the present invention). In any case, the SI 120 indicates that a serving cell supports OSAP based system access and Mobile Allocation information (optional). If frequency hopping is used then the Mobile Allocation information indicates the subset of RF channels belonging to the Cell Allocation used in the frequency hopping sequence.

A maximum of 8 octets is needed to include SRP information 134 within an SI message 120 (i.e. a cell allocation can at most consist of 64 ARFCNs).

When SRP 134 information or the indicator 302 is included within an SI message 120 a single instance of OSAP Mobile Allocation information is seen as being sufficient for the packet radio resources that can be assigned using the OSAP procedure.

For example, the following structure could be added as a Rel-12 extension to the SI 21 message 120.

```
{ 0 | 1 -- OSAP based system access procedure supported
    { 0 -- OSAP Mobile Allocation not included as part of system
    information
        | 1 < Number of Octets : bit (3) >
        { < OSAP Mobile Allocation : bit (8) > } * (val(Number of
        Octets)+1)
        }
};
```

Each bit of each OSAP Mobile Allocation octet corresponds to a specific frequency in the Cell Allocation frequency list as currently described for the legacy Mobile Allocation information element.

5. Enhanced Immediate Assignment (EIA) Message 132 Content

This message 132 is formatted as shown in TABLE 3 below and is sent on the AGCH 106 by the network to provide mobile stations $104_1, 104_2, 104_3, 104_4 \ldots 104_n$ with a minimum amount of packet resource information 134 (i.e. as a result of receiving this information a MS $104_1$ can only receive PACCH messages 138 on the packet resources assigned by the EIA message 132 and must therefore wait until it receives additional TBF related information 134' and 136' on the PACCH 138 before an uplink TBF 128 can be used for payload transmission or payload can be received on a downlink TBF).

TABLE 3

ENHANCED IMMEDIATE ASSIGNMENT message 132 content

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | Enhanced Immediate Assignment Message Type | Message Type 10.4 | M | V | 1 |
| | EIA Rest Octets | EIA Rest Octets 10.5.2.xx | M | V | 1 ... 20 |

The length (in octets) of all information provided by the EIA Rest Octets IE and the value provided by the L2 Pseudo Length IE has a maximum value of 22 (see TABLE 5 above). The L2 pseudo length indicates the sum of the lengths of all information elements present in the EIA message 132 except the EIA Rest Octets IE and the L2 Pseudo Length IE itself and as such has a value of 2. This leaves a maximum of 20 octets (160 bits) of space available for the EIA Rest Octets IE.

One instance of the EIA Rest Octets IE is included per EIA message 132 and consists of the fields shown in TABLE 4 below where these fields are used as follows:

Page Mode (2 bits): One instance is included per EIA message 132.

Implicit Reject CS (1 bit): One instance is included per EIA message 132. Note that this is included so that an OSAP capable MS $104_1, 104_2, 104_3, 104_4 \ldots 104_n$ configured for LAP can detect an Implicit Reject for the CS domain when it happens to read an EIA message 132 on the AGCH 106 while attempting a non-OSAP system access for the CS domain.

Implicit Reject PS (1 bit): One instance is included per EIA message 132. Note that this is included so that an OSAP capable MS $104_1, 104_2, 104_3, 104_4 \ldots 104_n$ configured for LAP can detect an Implicit Reject for the PS domain when it reads an EIA message 132 on the AGCH 106 that does not provide matching FN Information+Random Bits.

Message Reference ID (2 bits): One instance is included per EIA message 132. This information is included so that a MS $104_1, 104_2, 104_3, 104_4 \ldots 104_n$ can compare the value of the Message Reference ID received in a subsequent ATI message 138 instance against the value received in the EIA message 132 and thereby verify when it has received an ATI message 138 instance that supplements a previously received EIA message 132.

Packet Channel Description (18 or 19): One instance is included per EIA message 132 (i.e. it is common to all MSs $104_1, 104_2, 104_3, 104_4 \ldots 104_n$ addressed by the EIA message 132) and its content is the same as per the legacy Packet Channel Description IE (see TABLE 4 below).

Mobile Allocation (1, 11, 19, 27 or 35): One instance may be included per EIA message 132 (i.e. when included it is common to all MS $104_1$, $104_2$, $104_3$, $104_4$ ... $104_n$ addressed by the EIA message 132) and it is limited to providing 32 bits Mobile Allocation information. If more than 32 bits of Mobile Allocation information are needed or Mobile Allocation information is sent using system information 120 (i.e. SRP 134) then this information is not included in the EIA message 132.

FN Information Length (2 bits): One instance is included per EIA message 132 and allows for 4 different lengths of FN Information to be indicated.

Temporary OSAP Identity Length (2 bits): One instance is included per EIA message 132 and allows for 4 different lengths of Temporary OSAP Identity to be indicated.

FN Information (Z bits=val(FN Information Length)+9): One instance is included per MS $104_1$, $104_2$, $104_3$, $104_4$ ... $104_n$ addressed by the EIA message 132 for the purpose of uplink TBF 128 establishment.

FN Information=the binary value of 'FN modulo X' where FN=the TDMA frame number of the burst in which an Enhanced Packet Channel Request 124 was received on the RACH 126 by the BSS 102.

X can be set to reflect an acceptable probability for TDMA frame number collision. For example, for X=256 (Z=8 bits) the time between uplink bursts for which FN mod 256 has the same value is 1.18 sec (i.e. each TDMA frame=4.615 ms, 256*4.615=1.18).

This means there will be some degree of uncertainty on behalf of mobile stations $104_1$, $104_2$, $104_3$, $104_4$ ... $104_n$ regarding whether or not matching 'FN Information' they receive in an EIA message 132 really reflects the specific burst in which they sent their access request message on the RACH 126.

The length of the MS specific FN information (Z bits) included in an EIA message 132 is variable allowing for operators to increase/decrease the probability of TDMA FN collision to a level they are comfortable with.

Random Bits (4 bits): One instance is included per MS $104_1$, $104_2$, $104_3$, $104_4$ ... $104_n$ addressed by the EIA message 132 and has a corresponding instance of the FN Information field (i.e. corresponding instances of FN Information and Random Bits sent in an EIA message 132 are a reflection of the "Z" least significant bits of the TDMA FN and Random Bits received by the BSS 102 within an earlier EPCR message 124).

Temporary OSAP Identity (Y bits=val(Temporary OSAP Identity Length)+9): One instance is included per MS $104_1$, $104_2$, $104_3$, $104_4$ ... $104_n$ addressed by the EIA message 132 for the purpose of downlink TBF establishment. It allows for an EIA message 132 to identify each mobile station $104_1$, $104_2$, $104_3$, $104_4$ ... $104_n$ based on its specific Temporary OSAP Identity. If a MS $104_1$, $104_2$, $104_3$, $104_4$ ... $104_n$ has not been assigned a Temporary OSAP Identity then legacy procedures are used for downlink TBF establishment.

TABLE 4

EIA Rest Octets Information Element

```
< EIA Rest Octets > ::=
< Page Mode : bit (2) >
< Implicit Reject CS : bit >
< Implicit Reject PS : bit >
< Message Reference ID : bit (2) >
< Packet Channel Description : < Packet Channel Description struct > >
{ 0 | 1 < Mobile Allocation Length : bit (2) >
      < Mobile Allocation : bit (8 * ( val(Mobile Allocation Length) + 1)) > }
< FN Information Length : bit (2) >
< Temporary OSAP Identity Length : bit (2) >
{ 1     < MS Specific EIA Parameters : < MS Specific EIA Parameters struct > > } ** 0
<spare padding> ;
< Packet Channel Description struct> ::=
< TN : bit (3) >
< TSC : bit (3) >
{ 0
    { 0    < ARFCN : bit (10) >   -- non-hopping RF channel configuraion
      | 1    < MAIO : bit (6) >    -- indirect encoding of hopping RF channel
configuration
           < MA_NUMBER_IND : bit >
           { 0 | 1 < CHANGE_MARK_1 : bit (2) > }
    }
    | 1
        < MAIO : bit (6) >         -- direct encoding of hopping RF channel
configuration
        < HSN : bit (6) >
} ;
< MS Specific EIA Parameters struct> ::=
{ 0    < FN Information : bit (val(FN Information Length) + 9) >
       < Random Bits : bit (4) >
   | 1    < Temporary OSAP Identity : bit (val(Temporary OSAP Identity Length) +
9) >
} ;
```

EIA Example 1: The EIA message 132 is used only for the case of uplink TBF 128 establishment where FN Information provided for each MS $104_1$, $104_2$, $104_3$, $104_4$ ... $104_n$ addressed by the EIA message 132 is 9 bits long (i.e. Z=9, X=512). In this case all MS $104_1$, $104_2$, $104_3$, $104_4$ ... $104_n$ making access requests 124 within a TDMA frame where the 9 least significant bits of that TDMA frame matches the FN Information sent in the EIA message 132 will then look at the corresponding Random Bits field to determine if they have received a response that matches their access request 124. Note that in this case the TDMA frames having the same 9 least significant bits will be a multiple of 2.36 sec apart (i.e. 512*4.615 ms=2.36 s).

The EIA message 132 content specific to each addressed MS=FN Information (9)+Random Bits (4)+MS ID Discriminator (1)=14 bits.

The EIA message 132 content for which a single instance is included (regardless of how many MS 104₁, 104₂, 104₃, 104₄ . . . 104ₙ are addressed)=Page Mode (2)+Implicit Reject CS (1)+Implicit Reject PS (1)+Message Reference ID (2)+Packet Channel Description (19)+Mobile Allocation (1)+FN Information Length (2)+Temporary OSAP Identity Length (2)=30 bits.

The maximum number of MS 104₁, 104₂, 104₃, 104₄ . . . 104ₙ addressed per EIA message 132=8 (i.e. 8*14+30=142).

According to TABLE 4 above 10 bits of CSN.1 overhead are required for the EIA message 132 (1 bit to indicate no mobile allocation is included, 1 bit for each of the 8 instances of the MS Specific EIA Parameters IE included in the message and 1 bit to indicate the "direct encoding of hopping RF channel configuration" is used).

The resulting EIA message 132 has a total length of 152 bits.

EIA Example 2: This example builds on EIA example 1 above except that it allows for 10 bits of FN Information (i.e. Z=10, X=1024) for each MS 104₁, 104₂, 104₃, 104₄ . . . 104ₙ addressed by the EIA message 132. In this case all MS 104₁, 104₂, 104₃, 104₄ . . . 104ₙ making access requests 124 within a TDMA frame where the 10 least significant bits of that TDMA frame matches the FN Information sent in the EIA message 132 will then look at the corresponding Random Bits field to determine they have received a response that matches their access request 124. Note that in this case the TDMA frames having the same 10 least significant bits will be a multiple of 4.72 sec apart (i.e. 1024*4.615 ms=4.72 s).

The EIA message 132 content specific to each addressed MS=FN Information (10)+Random Bits (4)+MS ID Discriminator (1)=15 bits.

The EIA message 132 content for which a single instance is included (regardless of how many MS are addressed)=Page Mode (2)+Implicit Reject CS (1)+Implicit Reject PS (1)+Message Reference ID (2)+Packet Channel Description (19)+Mobile Allocation (1)+FN Information Length (2)+Temporary OSAP Identity Length (2)=30 bits.

The maximum number of MS 104₁, 104₂, 104₃, 104₄ . . . 104ₙ addressed per EIA message 132=8 (i.e. 8*15+30=150).

According to TABLE 4 above 10 bits of CSN.1 overhead are required for the EIA message 132 (1 bit to indicate no mobile allocation is included, 1 bit for each of the 8 instances of the MS Specific EIA Parameters IE included in the message and 1 bit to indicate the "direct encoding of hopping RF channel configuration" is used).

The resulting EIA message 132 has a total length of 160 bits.

EIA Example 3: This example builds on example 2 above except that it allows for 24 bits of Mobile Allocation information to be included within the EIA message 132.

The EIA message 132 content specific to each addressed MS=FN Information (10)+Random Bits (4)+MS ID Discriminator (1)=15 bits.

The EIA message 132 content for which a single instance is included (regardless of how many MS are addressed)=Page Mode (2)+Implicit Reject CS (1)+Implicit Reject PS (1)+Message Reference ID (2)+Packet Channel Description (19)+Mobile Allocation (27)+FN Information Length (2)+Temporary OSAP Identity Length (2)=56 bits.

The maximum number of MS 104₁, 104₂, 104₃, 104₄ . . . 104ₙ addressed per EIA message 132=6 (i.e. 6*15+56=146).

According to TABLE 4 above 8 bits of CSN.1 overhead are required for the EIA message 132 (1 bit to indicate a mobile allocation is included, 1 bit for each of the 6 instances of the MS Specific EIA Parameters IE included in the message and 1 bit to indicate the "direct encoding of hopping RF channel configuration" is used).

The resulting EIA message 132 has a total length of 154 bits

6. Additional TBF Information (ATI) Message 138 Content

This message 138 is formatted as shown in TABLE 5 below and is sent on the PACCH 140 by the network to provide mobile stations 104₁, 104₂, 104₃, 104₄ . . . 104ₙ with additional information 134' and 136' required for uplink TBF 128 or downlink TBF establishment. A set of one or more ATI message 138 instances can be sent by the BSS 102 where each instance in the set corresponds to the same EIA message 132 and is carried within a single PACCH block. This will minimize the amount of information any given MS 104₁, 104₂, 104₃, 104₄ . . . 104ₙ addressed by a given EIA message 132 must receive within the EIA message 132. Note that until a MS receives an ATI message 138 instance containing information that supplements the information it previously received in an EIA message 132 it can only receive on the downlink PACCH 140 the packet resources assigned by the EIA message 132. The content of this message 138 consists of the following:

MS Specific TBF Parameters (X bits): One instance is included per MS 104₁, 104₂, 104₃, 104₄ . . . 104ₙ addressed by an ATI message 138.

Page Mode (2 bits): One instance is included per ATI message 138.

Message Reference ID (2 bits): One instance is included per ATI message 138. This information is included so that a MS 104₁, 104₂, 104₃, 104₄ . . . 104ₙ can compare it to the value in the previously received EIA message 132 and thereby verify when it has received an ATI message 138 that corresponds to the EIA message 132 in which it detected matching FN Information and Random Bits.

MS Assignment Bitmap (8 bits): One instance is included per ATI message 138. This bitmap indicates which subset of MS addressed by a given EIA message 132 are assigned resources by a received ATI message 138. Depending on the amount of MS specific information required, multiple ATI messages 138 corresponding to the same EIA message 132 can be sent. The net result is that the "Nth" MS 104₁, 104₂, 104₃, 104₄ . . . 104ₙ addressed by an EIA message 132 will only have to correctly receive one corresponding ATI message 132 instance (i.e. the ATI message instance having a MS Assignment Bitmap with a "1" in bit position "N").

Figure 17C:
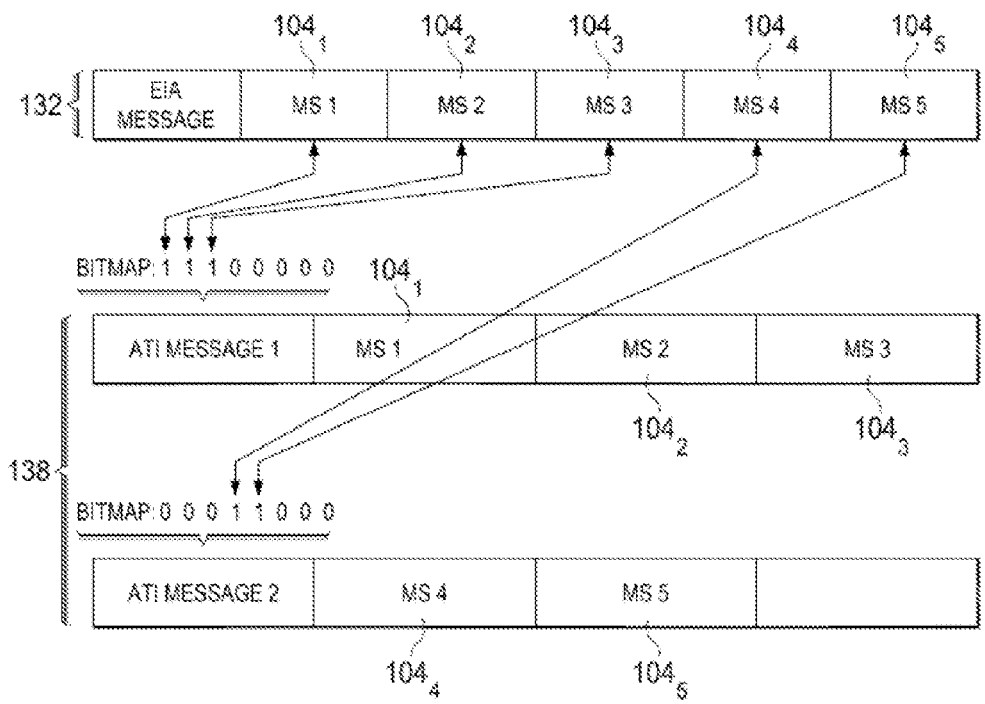

For example, if we assume that 5 MS 104₁, 104₂, 104₃, 104₄, 104₅ are addressed in a given EIA message 132 then 2 corresponding ATI message 138 instances can be sent where ATI message instance 1 addresses MS1, MS2 and MS3 and ATI message instance 2 addresses MS4 and MS5 as per FIG. 17c. Thus any combination of up to 8 MSs 104₁, 104₂, 104₃, 104₄ . . . 104ₙ can be addressed in the set of ATI message 138 instances corresponding to the same EIA message 132.

The number of MS 104₁, 104₂, 104₃, 104₄ . . . 104ₙ addressed by the MS Specific TBF Parameters IE included in a given ATI message 138 instance can therefore be a subset of the total number of MS 104₁, 104₂, 104₃, 104₄ . . . 104ₙ addressed by the MS Specific EIA Parameters IE included in the EIA Rest Octets IE (see TABLE 4) carried within the corresponding EIA message 132. The ordering of MS addressed by the MS Specific TBF Parameters IE included in a given ATI message 138 instance will therefore be determined by the MS Assignment Bitmap IE.

TABLE 5

Additional TBF Information (ATI) Message 138

< Additional TBF Information message content > ::=
< PAGE_MODE : bit (2) >
< Message Reference ID : bit (2) >
< MS Assignment Bitmap : bit (8) >
{ 1     < MS Specific TBF Parameters : < MS Specific TBF Parameters struct > > } ** 0
<spare padding>;
< MS Specific TBF Parameters struct> ::=
{ 00        < EGPRS Packet Uplink Assignment >
    | 01    < Packet Uplink Assignment >
    | 10    < Packet Downlink Assignment >
    | 11    - reserved
} ;
< EGPRS Packet Uplink Assignment > : :=
{ 0 | 1    < Access Technologies Request : Access Technologies Request struct > }
{ 0        -- one phase access indication
           < TFI_ASSIGNMENT : bit (5) >
           < POLLING : bit >
           < USF: bit (3) >
           < USF_GRANULARITY : bit >
           { 0 | 1 < P0 : bit (4) >
           < PR_MODE : bit (1) > }
           < EGPRS CHANNEL_CODING_COMMAND : < EGPRS Modulation and
Coding Scheme IE >>
           < TLLI_BLOCK_CHANNEL_CODING : bit (1) >
           { 0 | 1 < BEP_PERIOD2 : bit (4) > }
           < RESEGMENT : bit (1) >
           < EGPRS Window Size : < EGPRS Window Size IE >> -- 5 bits
           { 0 | 1 < ALPHA : bit (4) > }
           < GAMMA : bit (5) >
           { 0 | 1 < TIMING_ADVANCE_INDEX : bit (4) > }
           { 0 | 1 < TBF_STARTING_TIME : bit (16) > }
               { 0     -- '0' indicates that FANR is not activated
                 | 1   -- '1' indicates that FANR is activated
                     { 0       -- SSN-based encoding is selected
                       | 1     -- Time-based encoding is selected
                           < REPORTED TIMESLOTS : bit (8) >
                           < TSH : bit (2) > } }
           | 1    -- An uplink RTTI TBF is assigned
               < RTTI USF Mode : bit(1) >
               < PDCH PAIR INDICATION: bit(3) >
                           < Additional_USF : bit (3) >*(1−val(RTTI USF MODE))
               { 0                     -- One PDCH Pair assigned
                 | 1  < USF2 : bit(3)>    -- Two PDCH Pairs assigned
                           < Additional_USF2 : bit (3) >*(1−val(RTTI USF MODE)) }
               { 0     -- SSN-based encoding is selected
                 | 1   -- Time-based encoding is selected
                       < REPORTED TIMESLOTS : bit (8) >
                       < TSH : bit (2) > }
    | 1    -- two phase access indication (Multi Block Allocation)
           { 0 | 1 < ALPHA : bit (4) > }
           < GAMMA : bit (5) >
           < TBF_STARTING_TIME : bit (16) >
           < NUMBER OF RADIO BLOCKS ALLOCATED : bit (2) >
           { 0 | 1 < P0 : bit (4) >
               < PR_MODE : bit (1) > }
}
{ 0 | 1 < PFI : bit (7) > } ;
<Access Technologies Request struct> ::=
    -- recursive structure allows any combination of Access technologies
    < Access Technology Type : bit (4) >
    { 0 | 1 <Access Technologies Request struct> } ;
< Packet Uplink Assignment > ::=
{ 0     -- one phase access
    < TFI_ASSIGNMENT : bit (5) >
    < POLLING : bit >
    < USF: bit (3) >
    < USF_GRANULARITY : bit >
    { 0 | 1 < P0 : bit (4) >
        PR_MODE : bit (1) > }
    < CHANNEL_CODING_COMMAND : bit (2) >
    < TLLI_BLOCK_CHANNEL_CODING : bit >
    { 0 | 1 < ALPHA : bit (4) > }
    < GAMMA : bit (5) >
    { 0 | 1 < TIMING_ADVANCE_INDEX : bit (4) > }
    { 0 | 1 < TBF_STARTING_TIME : bit (16) > }

TABLE 5-continued

Additional TBF Information (ATI) Message 138

```
    | 1   -- two phase access indication (Single Block Allocation)
            { 0 | 1 < ALPHA : bit (4) > }
            < GAMMA : bit (5) >
            < TBF_STARTING_TIME : bit (16) >
            { L | H < P0 : bit (4) >
                < PR_MODE : bit (1) > }
}
{ 0 | 1 < PFI : bit (7) > } ;
< Packet Downlink Assignment > ::=
    { 0 | 1   < TFI_ASSIGNMENT : bit (5) >
            < RLC_MODE : bit >
            { 0 | 1 < ALPHA : bit (4) > }
            < GAMMA : bit (5) >
            < POLLING : bit >
            < TA_VALID : bit (1) > }
    { 0 | 1   < TIMING_ADVANCE_INDEX : bit (4) > }
    { 0 | 1   < TBF_STARTING_TIME : bit (16) > }
    { 0 | 1   < P0 : bit (4) >
            < PR_MODE : bit (1) > }
    { 0 | 1   -- indicates EGPRS TBF mode, see 44.060
            < EGPRS Window Size : < EGPRS Window Size IE >>
            < LINK_QUALITY_MEASUREMENT_MODE : bit (2) >
            { 0 | 1 < BEP_PERIOD2 : bit (4) > } }
    { 0      | 1 < PFI : bit (7) > }
    { 0      | 1 < NPM Transfer Time : bit (5) > }
    { 0      - A downlink BTTI TBF is assigned
        { 0      -- FANR is not activated for the assigned TBF
          | 1    -- FANR is activated for the assigned TBF
                < EVENT_BASED_FANR: bit (1) > }
      | 1      -- A downlink RTTI TBF is assigned
                < EVENT_BASED_FANR: bit (1) >
                < PDCH PAIR INDICATION: bit(3) > }
    < Downlink EGPRS Level: < EGPRS Level IE > > ;
```

ATI Example 1: In this example a one phase access assignment is considered where all MS $104_1$, $104_2$, $104_3$, $104_4$ ... $104_n$ are assigned uplink TBF 128 resources using the Packet Uplink Assignment IE of TABLE 5 above:

MS Specific TBF Parameters=1+Packet Uplink Assignment (2)+One Phase Access (1)+TFI_ASSIGNMENT (5)+POLLING (1)+USF (3)+USF_GRANULARITY (1)+{1+PO (4)+PR_MODE (1)}+CHANNEL_CODING_COMMAND (2)+TLLI_BLOCK_CHANNEL_CODING (1)+{1+ALPHA (4)}+GAMMA (5)+{1+TIMING_ADVANCE_INDEX (4)}+{1+TBF_STARTING_TIME (0)}+{1+PFI(7)}=47 bits ATI message 138 instance 1 addresses 3 MS as per FIG. 3C=Page Mode (2)+Message Reference ID (2)+MS Assignment Bitmap (8)+3*(MS Specific TBF Parameters)=12+3*(47)=153 bits=1 PACCH block.

ATI message 138 instance 2 addresses 2 MS as per FIG. 3C=Page Mode (2)+Message Reference ID (2)+MS Assignment Bitmap (8)+2*(MS Specific TBF Parameters)=12+2*(47)=106 bits=1 PACCH block.

ATI Example 2: In this example a two phase access assignment is considered where all MS $104_1$, $104_2$, $104_3$, $104_4$ ... $104_n$ are assigned uplink TBF 128 resources using the Packet Uplink Assignment IE of TABLE 5 above:

MS Specific TBF Parameters=1+Packet Uplink Assignment (2)+Two Phase Access (1)+{1+ALPHA (4)}+GAMMA (5)+TBF_STARTING_TIME (16)+{1+PO (4)+PR_MODE (1)}+{1+PFI(7)}=44 bits ATI message 138 instance 1 addresses 3 MS as per FIG. 3C=Page Mode (2)+Message Reference ID (2)+MS Assignment Bitmap (8)+3*(MS Specific TBF Parameters)=12+3*(44)=144 bits=1 PACCH block.

ATI message 138 instance 2 addresses 2 MS as per FIG. 3C=Page Mode (2)+Message Reference ID (2)+MS Assignment Bitmap (8)+2*(MS Specific TBF Parameters)=12+2*(44)=100 bits=1 PACCH block.

ATI Example 3: In this example a two phase access assignment is considered where all MS $104_1$, $104_2$, $104_3$, $104_4$ ... $104_n$ are assigned uplink TBF 128 resources using the EGPRS Packet Uplink Assignment IE of TABLE 5 above:

MS Specific TBF Parameters=1+EGPRS Packet Uplink Assignment (2)+{1+Access Technologies Request (0)}+Two Phase Access (1)+{1+ALPHA (4)}+GAMMA (5)+TBF_STARTING_TIME (16)+NUMBER_OF_RADIO_BLOCKS ALLOCATED (2)+{1+PO (4)+PR_MODE (1)}+{1+PFI(7)}=47 bits ATI message 138 instance 1 addresses 3 MS as per FIG. 3C=Page Mode (2)+Message Reference ID (2)+MS Assignment Bitmap (8)+3*(MS Specific TBF Parameters)=12+3*(47)=153 bits=1 PACCH block.

ATI message 138 instance 2 addresses 2 MS as per FIG. 3C=Page Mode (2)+Message Reference ID (2)+MS Assignment Bitmap (8)+2*(MS Specific TBF Parameters)=12+2*(47)=106 bits=1 PACCH block.

7. Downlink TBF Establishment Using OSAP Messages

Here we consider the case where a MS $104_1$, $104_2$, $104_3$, $104_4$ ... $104_n$ in Idle mode can be assigned a downlink TBF without first performing the paging procedure (i.e. the Ready timer has not expired (is running) and the network knows the MS location at the cell level). According to legacy operation, downlink TBF establishment is performed by sending an Immediate Assignment message that includes a Packet Downlink TBF Assignment on its paging group (if in DRX mode) or on any AGCH occurrence (if in non-DRX mode immediately following TBF release).

When considering an OSAP capable MS $104_1$, $104_2$, $104_3$ ... $104_n$ the network has the option of using the EIA 132 and ATI 138 messages defined for OSAP to allocate such a MS packet resources for a downlink TBF as follows:

The network must assign the OSAP capable MS $104_1$, $104_2$, $104_3$ ... $104_n$ an alternate identity (called a Temporary OSAP Identity) on a per cell basis that remains valid while the Ready timer has not expired (is running).

This requires a BSS 102 to have knowledge of the length of the Ready timer which can be realized in a number of ways (e.g. through the support of PFCs).

The BSS 102 can use PACCH 140 signaling to assign a MS $104_1, 104_2, 104_3 \ldots 104_n$ a Temporary OSAP Identity (TOI) at any time while a TBF is ongoing for an OSAP capable MS $104_1, 104_2, 104_3 \ldots 104_n$.

Once a MS $104_1, 104_2, 104_3 \ldots 104_n$ has been assigned a TOI then as long as it remains valid it can be included in an EIA message 132 that includes DL TBF related information for that MS (see the Temporary OSAP Identity field in TABLE 4).

Figure 17D:
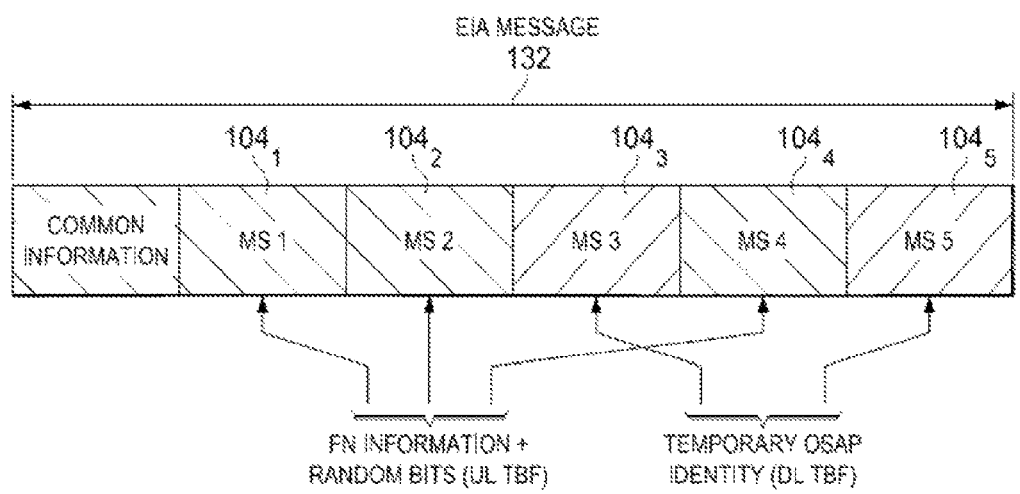

Since the use of FN Information+Random Bits (for UL TBF 128 establishment) or Temporary OSAP Identity (for DL TBF establishment) is indicated per instance of MS $104_1, 104_2, 104_3 \ldots 104_n$ addressed by an EIA message 132, any given instance of an EIA message can support any combination of MSs $104_1, 104_2, 104_3 \ldots 104_n$ for which either UL or DL TBF establishment is needed (see FIG. 17d—which shows 5 MSs).

The Temporary OSAP Identity can be from 9 to 12 bits in length allowing for up to a maximum of 4096 such identities to be maintained per cell.

It should be noted that this mechanism for DL TBF establishment reduces the overall DL CCCH load, thus providing additional CCCH capacity for non-OSAP mobile stations.

The net benefit of having the OSAP messages also allow for DL TBF establishment is of course that a single EIA message 132 sent on the AGCH 106 can address up to 8 MS $104_1, 104_2, 104_3, 104_4 \ldots 104_n$ for which DL TBF establishment is needed. An OSAP capable MS $104_1, 104_2, 104_3, 104_4 \ldots 104_n$ that has been assigned a Temporary OSAP Identity will acquire SRP information 134/indicator 302 from SI 120, receive an EIA message 132 and a supplemental ATI message 138 instance to establish a DL TBF following the same steps used for UL TBF 128 establishment except that it is addressed using the Temporary OSAP Identity in the EIA message 132 (i.e. it cannot be addressed using FN Information+Random Bits since the RACH 126 is not used during DL TBF establishment for a MS $104_1, 104_2, 104_3 \ldots 104_n$ having a Temporary OSAP Identity in Idle mode).

8. Conclusion

A mechanism for enhancing AGCH 106 capacity has been described based on introducing an optimized system access procedure (OSAP) whereby the amount of MS specific information within an assignment message 132 sent on the AGCH 106 can be minimized by using new BCCH information and PACCH 140 signaling to provide supplemental MS specific information. As indicated by the examples provided in section 5 above, a significant AGCH 106 capacity gain is possible when using OSAP (e.g. 8 mobile stations $104_1, 104_2, 104_3 \ldots 104_n$ can be addressed by a single assignment message 132 sent on the AGCH 106). The OSAP related signaling used for UL TBF 128 establishment can also be used for DL TBF establishment for a MS $104_1, 104_2, 104_3 \ldots 104_n$ whose location is known at the cell level. Thereby the same AGCH 106 capacity gain can be achieved for any combination of UL and DL TBF establishment. Considering that the AGCH 106 capacity is seen as becoming increasingly problematic if the load offered by devices supporting delay tolerant applications increases significantly over the next few years, the introduction of OSAP as a new GERAN Rel-12 feature as described herein is seen as being beneficial towards minimizing the potential for the AGCH 106 to become a bottleneck.

REFERENCES

[1] GP-111202—Continued discussion for IPA parameters—Huawei Technologies Co., Ltd.
[2] GP-111065—Usage of Higher MCSs on CCCH Downlink—Telefon AB LM Ericsson, ST-Ericsson SA
[3] GP-111708—Improved AGCH Capacity using Static Radio Parameters—Telefon AB LM Ericsson, ST-Ericsson SA
[4] GP-111709—Calculating the Probability of Access Collision—Telefon AB LM Ericsson, ST-Ericsson SA
[5] GP-111085—Analysis on Traffic Characteristic of IM Service in China—CMCC The cited references can be found at www.3GPP.org.

The following detailed discussion describes various other related embodiments. In particular, the following detailed discussion is based on an article prepared by the inventors which is entitled "Detailed OSAP Signalling Procedure" 3GPP TSG-GERAN #54, GP-120624 and was presented by the inventors in Sanya, China, May 14-18, 2012.

Detailed OSAP Signalling Procedures

Introduction

The OSAP feature described in the aforementioned GP-120623 paper involves the introduction of new signaling procedures for more efficiently establishing both uplink and downlink TBFs. The detailed signaling procedures associated with the OSAP feature used for establishing uplink and downlink TBFs are examined in greater detail herein where it can be seen that this signaling essentially includes a combination of new signaling combined with legacy signaling as follows:

New BCCH information 120 that indicates the OSAP feature is supported by the network and which provides information about the packet data resources that can be assigned using OSAP based signaling.

A new RACH message 124 that allows a BSS 102 to uniquely determine that a MS $104_1, 104_2, 104_3, 104_4 \ldots 104_n$ is requesting OSAP based signaling for uplink TBF 128 establishment.

New AGCH and PACCH signaling 132 and 138 supporting the establishment of uplink and downlink TBFs used for uplink and downlink user data transmission (e.g. 130a and 130b for the case of uplink data transmission).

The legacy one phase and two phase contention resolution procedure for uplink TBF 128 establishment.

Legacy TBF management and release procedures for uplink and downlink TBFs established using OSAP based signaling.

2. OSAP—Detailed Operation for UL TBF 128 Establishment

A serving cell that supports OSAP based signaling is managed by a corresponding BSS 102 that is capable of receiving a new 11-bit RACH message 124 consisting of an access burst that involves the use of a new training sequence code (TSC). Upon reading all OSAP related system information, an OSAP capable MS $104_1, 104_2, 104_3 \ldots 104_n$ will use this new TSC along with the signaling procedures shown in FIG. 18a (OSAP Signalling Procedures for UL TBF Establishment-Part 1) and FIG. 18b (OSAP Signalling Procedures for UL TBF Establishment-Part 2) below whenever it has uplink payload to send for the PS domain.

Figure 18A:
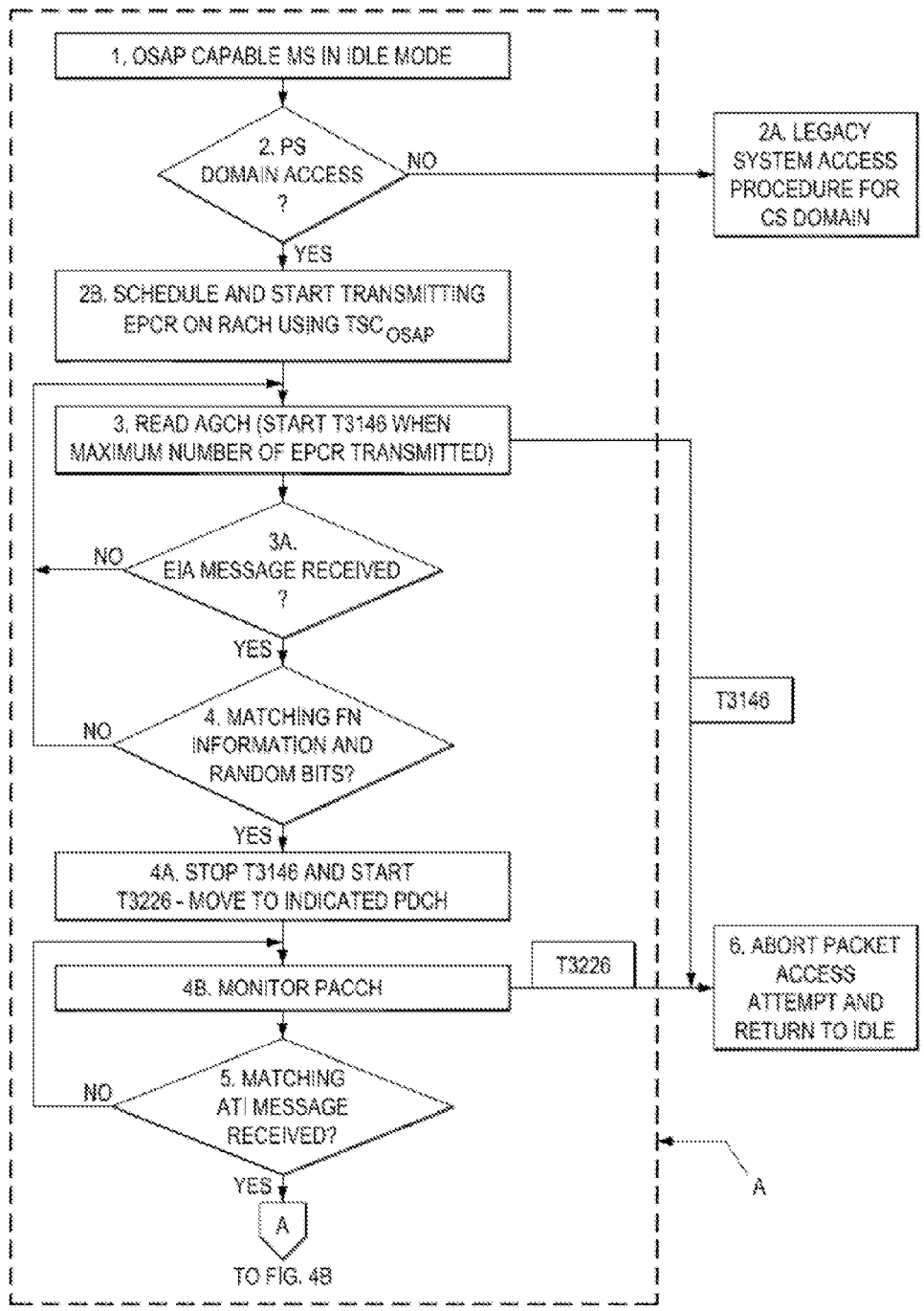
FIGS. 18a-c illustrate methods and operations by a mobile station and a BSS for optimized system access procedure according to some embodiments, and disclosed in an article prepared by the inventors entitled "Detailed OSAP Signalling Procedure" 3GPP TSG-GERAN #54, GP-120624 and was presented by the inventors in Sanya, China, May 14-18, 2012.
Figure 18B:
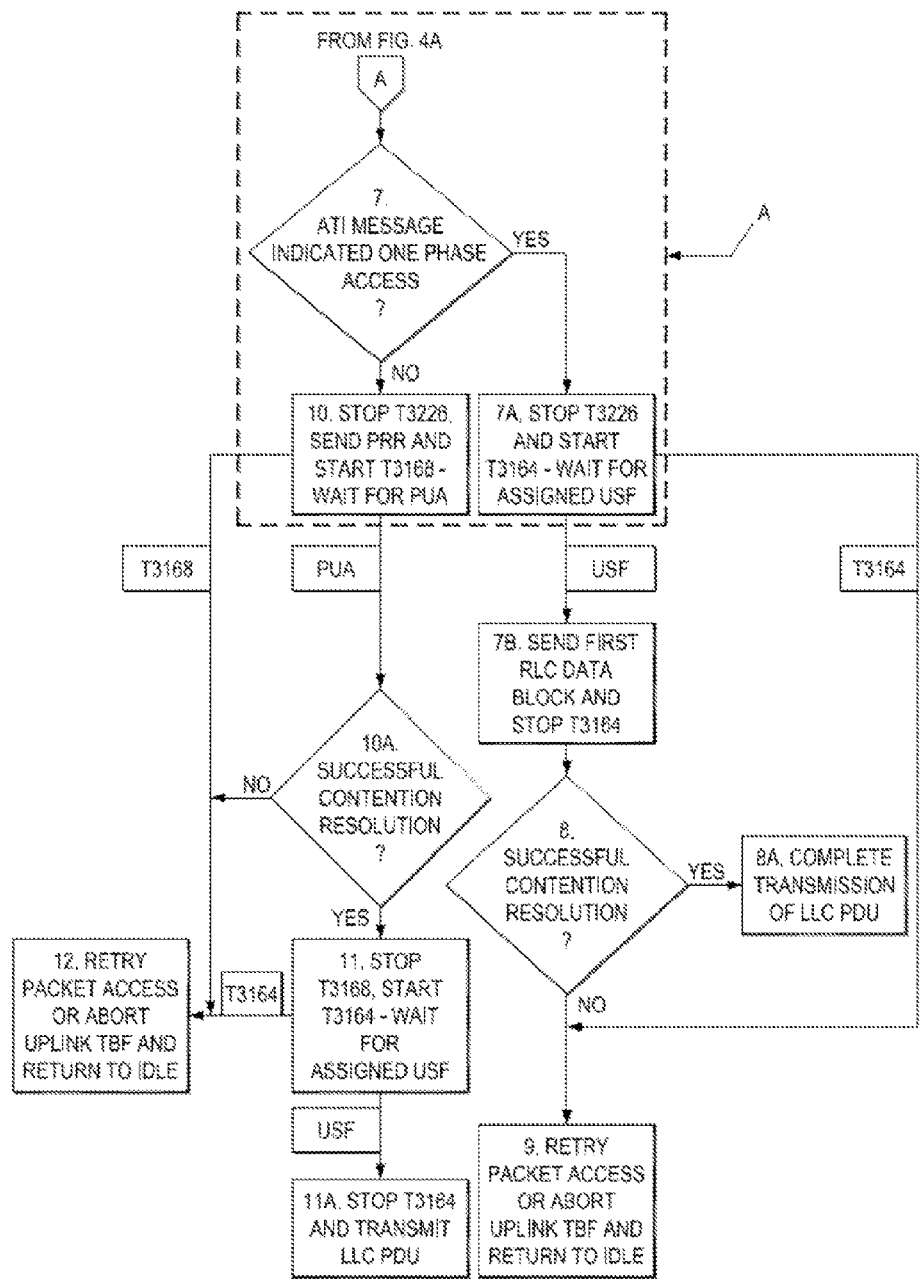

The structures within the box labeled with the numeral "A" in FIGS. 18a-18b indicate the use of new procedures and timers whereas the remaining structures indicate the use of legacy procedure and timers.

The OSAP based signalling described below allows for both one phase and two phase system access procedures and corresponding contention resolution as per legacy operation.

The code points supported by the new 11-bit RACH message 124 allow for indicating the same basic types of access requests as can be requested using legacy RACH messages (i.e. "one phase access", "two phase access", "signaling" and "single block packet access").

OSAP based signaling described below allows a BSS 102 to respond to a new RACH burst 124 by directing a MS $104_1, 104_2, 104_3, 104_4 \ldots 104_n$ to use either a one phase or two phase system access according to the flexibility supported by legacy operation.

1) An OSAP capable MS $104_1, 104_2, 104_3 \ldots 104_n$ reads OSAP specific system information 120 once every 30 seconds as per the legacy SI refresh rate and then enters Idle mode.

2) All PS domain access attempts triggered by a MS $104_1, 104_2, 104_3 \ldots 104_n$ capable of OSAP are subject to using OSAP procedures whereas all CS domain access attempts triggered by such a MS $104_1, 104_2, 104_3 \ldots 104_n$ will be managed using legacy CS domain related procedures. An OSAP capable MS $104_1, 104_2, 104_3 \ldots 104_n$ attempting a PS domain access therefore schedules and starts sending new RACH bursts referred to as Enhanced Packet Channel Request (EPCR) messages 124 which support 11 bits of payload space and a training sequence code (TSC) that allows a BSS 102 to uniquely detect reception of an EPCR message 124.

The code points supported by the EPCR message 124 allow for a MS $104_1, 104_2, 104_3 \ldots 104_n$ to indicate "one phase access", "two phase access", "signaling" and "single block packet access" as per PS domain related code points supported by the legacy EGPRS Packet Channel Request message (see TABLE 6).

3) After starting the access procedure by transmitting an EPCR message 124 the MS $104_1, 104_2, 104_3 \ldots 104_n$ starts looking for an Enhanced Immediate Assignment (EIA) message 132 with matching "FN Information" and "Random Bits". T3146 (legacy) is only started after the maximum number of EPCR messages 124 have been transmitted.

4) Upon receiving an Enhanced Immediate Assignment (EIA) message 132 with matching "FN Information" and "Random Bits" (carried within the MS Specific EIA Parameters IE) the MS $104_1, 104_2, 104_3 \ldots 104_n$ stops T3146 (if not expired, is running), starts T3226 (new), moves to the indicated PDCH resources and monitors the downlink PACCH 140 for a matching Additional TBF Information (ATI) message 138. Note that this means a BSS 102 must respond to an EPCR message 124 by sending an EIA message 132 since a MS $104_1, 104_2, 104_3 \ldots 104_n$ performing an OSAP based system access will only consider EIA messages 132 as potentially containing a matching response.

5) Upon receiving an ATI message 138 instance the MS $104_1, 104_2, 104_3 \ldots 104_n$ reads the "MS Assignment Bitmap" therein to determine if it is addressed by that ATI message instance. In other words, if it considered the Nth instance of information carried within the MS Specific EIA Parameters IE of the EIA message 132 to contain matching information then it checks to see if the Nth bit of this bitmap is set to "1". If the Nth bit is set to "1" then the MS $104_1, 104_2, 104_3 \ldots 104_n$ concludes that the corresponding instance of the MS Specific TBF Parameters IE in the received ATI message 138 provides it with all remaining information 134' and 136' needed for uplink TBF 128 establishment including whether or not it is to proceed using the one phase access or the two phase access procedure (see FIG. 18b).

A small Message Reference ID field (2 bits long) is present within both the EIA message 132 and ATI message 138 so that a MS $104_1, 104_2, 104_3, 104_4 \ldots 104_n$ can precisely associate a received ATI message 138 instance to the specific EIA message 132 that has the same Message ID value:

Note that the EIA message 132 will not include any TFI information (as it will instead be included in the ATI message 138) and as such a MS $104_1, 104_2, 104_3 \ldots 104_n$ assumes that if it received a match in the Nth instance of the MS specific information in an EIA message 132 then it is to use the Nth instance of the MS specific information in the ATI message 138 corresponding to that EIA message 132.

Since an ATI message 138 instance may potentially be missed by a mobile station $104_1, 104_2, 104_3 \ldots 104_n$ (i.e. even though it is sent using CS-1 coding) a BSS 102 may choose to make limited pre-emptive re-transmissions of these messages.

During times of heavy system access load a BSS 102 may need to send different sets of one or more ATI message 138 instances (i.e. each set of one or more ATI message 138 instances is unique in that it addresses the specific group of mobile stations $104_1, 104_2, 104_3 \ldots 104_n$ addressed by its corresponding EIA message 132) in relatively quick succession on the PACCH 140 of a specific packet resource while also making use of pre-emptive ATI message re-transmissions.

As such, to avoid the potential for a MS $104_1, 104_2, 104_3 \ldots 104_n$ to incorrectly associate an ATI message 138 instance with a previously received EIA message 132 (and thereby apply incorrect additional TBF information), the introduction of a two bit Message Reference ID field in both the EIA and ATI messages 132 and 138 is seen as being sufficient.

6) If T3146 expires prior to receiving a matching EIA message 132 or T3226 expires before receiving a matching ATI message 138 then the MS $104_1, 104_2, 104_3 \ldots 104_n$ aborts the packet access attempt and returns to Idle mode.

7) If the ATI message 138 indicates a one phase access is to be used the MS $104_1, 104_2, 104_3 \ldots 104_n$ stops T3226, starts T3164 and waits for the first instance of its assigned USF. Upon receiving the first instance of its assigned USF, the MS $104_1, 104_2, 104_3 \ldots 104_n$ stops T3164, sends its first RLC data block and proceeds with one phase access contention resolution according to legacy procedures. Note that even if a MS $104_1, 104_2, 104_3 \ldots 104_n$ indicates a one phase within an EPCR message 124 (see TABLE 8) the BSS 102 can still send an ATI message 138 that forces the MS $104_1, 104_2, 104_3 \ldots 104_n$ to perform a two phase access (see step 10 below).

8) If contention resolution is successful the MS $104_1, 104_2, 104_3 \ldots 104_n$ completes the transmission of its user data (LLC PDU) according to legacy operation. After completing the transmission of its user data the uplink TBF 128 is released according to legacy procedures.

9) If T3164 expires before the MS $104_1, 104_2, 104_3 \ldots 104_n$ receives the first instance of its assigned USF or it experiences unsuccessful one phase contention resolution it may either retry the packet access or abort the uplink TBF 128 as per legacy procedures.

10) If the ATI message 138 indicates a two phase access is to be used then the MS $104_1, 104_2, 104_3 \ldots 104_n$ stops T3226, sends a PRR, starts T3168 and waits for a PUA in response to the PRR. Upon receiving the PUA the MS $104_1, 104_2, 104_3 \ldots 104_n$ proceeds with two phase contention resolution according to legacy procedures.

Note that, similar to legacy operation, if the establishment cause in the EPCR message 124 indicates a request for a one phase packet access or signaling the network may send an ATI message 138 that grants either a one phase access or a two phase access. If a Multi Block allocation is granted by the ATI message 138 it forces the mobile station $104_1, 104_2, 104_3 \ldots 104_n$ to perform a two phase access.

11) If contention resolution is successful the MS $104_1, 104_2, 104_3 \ldots 104_n$ stops T3168, starts T3164 and waits for the first instance of its assigned USF. Upon receiving the first instance of its assigned USF then the MS $104_1, 104_2, 104_3 \ldots 104_n$ stops T3164 and begins transmitting its user data (LLC PDU) according to legacy operation. After completing the transmission of its user data the TBF 128 is released according to legacy procedures.

12) If T3168 expires before the MS $104_1, 104_2, 104_3 \ldots 104_n$ receives a PUA in response to the PRR or T3164 expires before the MS $104_1$, $104_2$, $104_3$ ... $104_n$ receives the first instance of its assigned USF or it experiences unsuccessful two phase contention resolution then the MS $104_1$, $104_2$, $104_3$ ... $104_n$ may either retry the packet access or abort the uplink TBF 128 as per legacy procedures.

TABLE 6

ENHANCED PACKET CHANNEL REQUEST message 124 content

```
< Enhanced Packet channel request message content > ::=
    < OSAP Request - one phase access :    000 < RandomBits : bit (8) >
>
    < OSAP Request - signalling :          001 < RandomBits : bit (8) >
>
    < OSAP Request - single block packet   010 < RandomBits : bit (8) >
access : >
    < OSAP Request - two phase access :    011 < RandomBits : bit (8) >
>;
```

2. OSAP—Detailed Operation for DL TBF Establishment

Figure 18C:
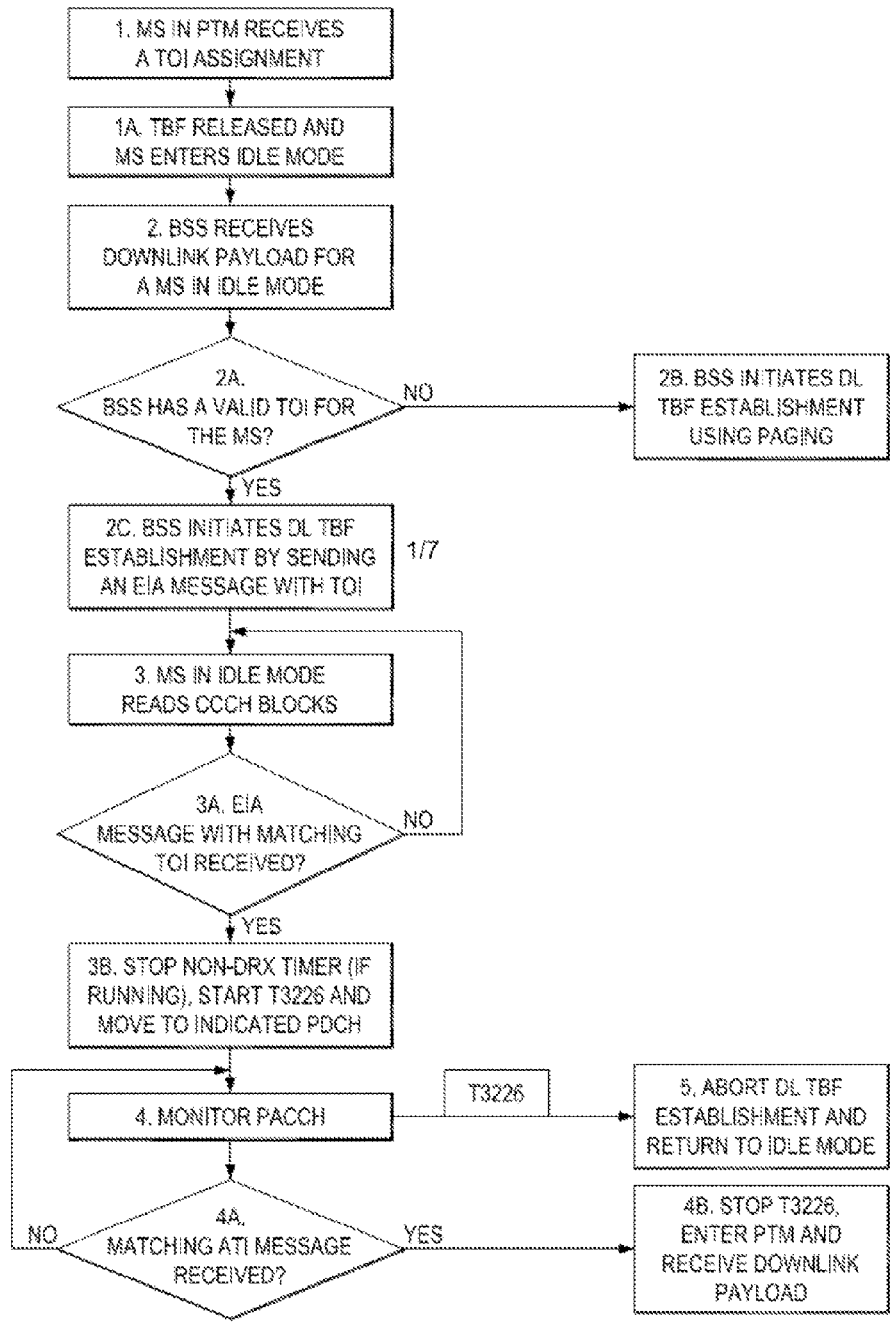

The scenario addressed is where an OSAP capable MS $104_1$, $104_2$, $104_3$ ... $104_n$ is in Idle mode and can be assigned a downlink TBF without first performing the paging procedure because its corresponding Ready timer has not expired (is running) and the network therefore knows the MS location at the cell level. In this case downlink TBF establishment is performed as shown in FIG. 18c (OSAP Signalling Procedures for DL TBF Establishment).

1) During an ongoing TBF the BSS 102 may at any time use PACCH 140 signaling assign a Temporary OSAP Identity (TOI) to an OSAP capable MS $104_1$, $104_2$, $104_3$ ... $104_n$. The assigned TOI remains valid for as long as the Ready timer has not expired (is running) and therefore requires a BSS 102 to have knowledge of the length of the Ready timer (e.g. this can be realized if PFC procedures are supported by the network).

2) Upon receiving downlink payload (i.e. LLC PDUs) for a MS $104_1$, $104_2$, $104_3$ ... $104_n$ in Idle mode having a valid TOI the BSS 102 initiates downlink TBF establishment by sending an EIA message 132 that includes the TOI of that MS (i.e. instead of FN Information+Random Bits):

If the non-DRX mode feature is not supported (i.e. at TBF release the MS $104_1$, $104_2$, $104_3$ ... $104_n$ immediately enters the DRX mode) the BSS 102 sends the EIA message 132 on the CCCH of the corresponding serving cell using any of the radio blocks defined by the paging group of that MS as defined in 3GPP TS 45.002 (the contents of which are incorporated herein by reference).

If the non-DRX mode feature is supported (i.e. at TBF release the MS $104_1$, $104_2$, $104_3$ ... $104_n$ immediately enters the non-DRX mode for a period of time determined by the non-DRX timer) and the BSS 102 determines that the MS $104_1$, $104_2$, $104_3$ ... $104_n$ is in the non-DRX mode it may send the EIA message 132 on the CCCH of the corresponding serving cell using any non-BCCH blocks. Otherwise, it sends the EIA message 132 on the CCCH of the corresponding serving cell using any of the radio blocks defined by the paging group of that MS).

3) Upon receiving an Enhanced Immediate Assignment (EIA) message 132 with matching TOI (carried within the MS Specific EIA Parameters IE) the MS $104_1$, $104_2$, $104_3$ ... $104_n$ stops the non-DRX timer (if not expired (is running)), starts T3226 (new), moves to the indicated PDCH resources and monitors the downlink PACCH 140 for a matching Additional TBF Information (ATI) message 138.

4) Upon receiving an ATI message 138 instance the MS $104_1$, $104_2$, $104_3$ ... $104_n$ reads the "MS Assignment Bitmap" therein to determine if it is addressed by that ATI message instance. In other words, if it considered the Nth instance of information carried within the MS Specific EIA Parameters IE of the EIA message 132 to contain matching information then it checks to see if the Nth bit of this bitmap is set to "1".

If the Nth bit is set to "1" then the MS $104_1$, $104_2$, $104_3$ ... $104_n$ concludes that the corresponding instance of the MS Specific TBF Parameters IE in the received ATI message 138 provides it with all remaining information needed for downlink TBF establishment.

5) If T3226 expires before receiving a matching ATI message 138 then the MS $104_1$, $104_2$, $104_3$ ... $104_n$ aborts the downlink TBF establishment attempt and returns to Idle mode.

4. Conclusion

The detailed operation of the OSAP procedure as described above effectively involves the distribution of uplink TBF 128 specific information over the BCCH 122, AGCH 106 and PACCH 140 (as compared to just the AGCH for legacy operation). This allows the MS specific portion of this distributed information sent on the AGCH 106 to be significantly reduced compared to legacy operation and an AGCH gain is thereby realized in that the number of MS $104_1$, $104_2$, $104_3$ ... $104_n$ addressed per OSAP specific AGCH assignment message 132 can be significantly increased compared to legacy AGCH assignment messages. Considering that AGCH 106 capacity is seen as becoming increasingly more problematic as system access load increases (e.g. due to the increased traffic load by MTC as well as increased use of instant messaging type applications) the introduction of OSAP as a new GERAN Rel-12 feature as described herein is seen as providing an essential AGCH capacity improvement.

FURTHER DEFINITIONS AND EMBODIMENTS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method implemented by a mobile station for establishing a downlink temporary block flow (TBF) from a base station subsystem (BSS), the method comprising the steps of:
performing cell re-selection while a READY timer of the mobile station has not expired;
following cell re-selection, receiving system information (SI) that is broadcast by the BSS;
determining from the SI whether the BSS is capable of assigning a temporary optimized system access procedure identity (TOI) to the mobile station for use in establishing downlink TBFs; and
responsive to determining that the BSS is capable of assigning a TOI to the mobile station, sending a cell update message comprising a radio link control (RLC) data block containing a remaining ready timer value indicating a remaining time of the READY timer, which has not expired, to the BSS for use in establishing subsequent downlink TBFs.

2. A method implemented by a mobile station for establishing a downlink temporary block flow (TBF) from a base station subsystem (BSS), the method comprising the steps of:
performing cell re-selection while a READY timer of the mobile station has not expired;
sending a cell update message comprising a radio link control (RLC) data block containing a remaining ready timer value indicating a remaining time of the READY timer, which has not expired, to the BSS for use in establishing subsequent downlink TBFs;
receiving from the BSS a temporary optimized system access procedure identity (TOI) that is assigned to the mobile station responsive to the sending of the cell update message; and
monitoring communications from the BSS for an access grant channel message containing the TOI assigned to the mobile station upon returning to Idle mode.

3. The method of claim 2, wherein the TOI is received by the mobile station by packet associated control channel (PACCH) signaling.

4. The method of claim 2, further comprising the step of:
receiving a packet uplink ack/nack (PUAN) message from the BSS, the PUAN message containing the TOI and a temporary logical link identity for the mobile station.

5. A method implemented by a mobile station for establishing a downlink temporary block flow (TBF) from a base station subsystem (BSS), the method comprising the steps of:
performing cell re-selection while a READY timer of the mobile station has not expired;
sending an enhanced packet channel request on a random access channel (RACH) to request system access;

receiving an enhanced immediate assignment (EIA) message on an access grant channel (AGCH), the EIA message identifying a packet data channel (PDCH) resource;

receiving an additional temporary block flow information (ATI) message on a packet associated control channel (PACCH) using the PDCH resource;

receiving an uplink state flag (USF) assigned to the mobile station; and sending a cell update message comprising a radio link control (RLC) data block containing a remaining ready timer value indicating a remaining time of the READY timer, which has not expired, to the BSS for use in establishing subsequent downlink TBFs.

6. A method implemented by a mobile station for establishing a downlink temporary block flow (TBF) from a base station subsystem (BSS), the method comprising the steps of:

performing cell re-selection while a READY timer of the mobile station has not expired; and sending a cell update message comprising a radio link control (RLC) data block containing a remaining ready timer value indicating a remaining time of the READY timer, which has not expired, to the BSS for use in establishing subsequent downlink TBFs, wherein a special length indicator (LI) value is provided in the RLC data block to indicate to the BSS that the RLC data block contains the remaining ready timer value.

7. The method of claim 6, further comprising the step of:
providing the remaining ready timer value at a location in the cell update message that immediately follows a location of the special LI value.

8. A method implemented by a mobile station for establishing a downlink temporary block flow (TBF) from a base station subsystem (BSS), the method comprising the steps of:

performing cell re-selection while a READY timer of the mobile station has not expired; and sending a cell update message comprising a radio link control (RLC) data block containing a remaining ready timer value indicating a remaining time of the READY timer, which has not expired, to the BSS for use in establishing subsequent downlink TBFs, wherein the remaining ready timer value is provided in the RLC data block as one group of binary coded bits representing the remaining time units of the ready timer and another group of bits defining a time unit applicable to the remaining time units of the ready timer.

9. The method of claim 8, wherein the remaining ready timer value of the RLC data block is 8 bits long, with 6 binary coded bits representing the remaining time of the ready timer and 2 additional bits defining the time unit by which the remaining time of the ready timer is periodically incremented.

10. A method implemented by a base station subsystem, BSS, for establishing downlink temporary block flows (TBFs) to a plurality of mobile stations, the method comprising the steps of:

receiving from the mobile station a cell update message comprising a radio link control (RLC) data block containing a remaining ready timer value indicating a remaining time of a READY timer of the mobile station;

responsive to receiving the cell update message comprising the payload of the RLC data block containing the remaining ready timer value, assigning a temporary optimized system access procedure identity (TOI) to the mobile station for use in establishing subsequent downlink TBFs;

sending the TOI to the mobile station;

starting a temporary OSAP identity timer (TOIT) having a timer value that is set based on the remaining ready timer value;

releasing the mobile station causing it to enter Idle mode; and responsive to data being ready for download to the mobile station and the TOIT having not yet expired, establishing subsequent downlink TBFs to the mobile station using the TOI assigned to the mobile station.

11. The method of claim 10, further comprising the step of:
responsive to data being ready for download to the mobile station and the TOIT having expired, performing a downlink TBF establishment procedure to the mobile station using a legacy mobile station identity.

12. The method of claim 10, further comprising the step of:
broadcasting system information (SI) to the plurality of mobile stations, where the SI includes an indication that the BSS is capable of assigning the TOI to the mobile station for use in establishing the downlink TBF.

13. The method of claim 10, wherein sending the TOI to the mobile station, comprises:
using packet associated control channel (PACCH) signaling to send the TOI to the mobile station.

14. The method of claim 10, wherein sending the TOI to the mobile station, comprises:
sending a packet uplink ack/nack (PUAN) message to the mobile station indicating receipt of the RLC data block, and including the TOI assigned to the mobile station in the PUAN message.

15. The method of claim 10, further comprising the steps of:

receiving an enhanced packet channel request on a random access channel (RACH) which requests system access for the mobile station;

sending an enhanced immediate assignment (EIA) message on an access grant channel (AGCH), the EIA message identifying a packet data channel (PDCH) resource;

sending an additional temporary block flow information (ATI) message on a packet associated control channel (PACCH) using the PDCH resource; and sending an uplink state flag (USF) assigned to the mobile station, wherein the cell update message is received responsive to the sending of the USF assigned to the mobile station.

16. The method of claim 10, further comprising the step of:
determining from a special length indicator (LI) value contained in the RLC data block containing the cell update message that the RLC data block contains the remaining ready timer value.

17. The method of claim 16, further comprising the step of:
identifying a location of the remaining ready timer value in the RLC data block containing the cell update message as immediately following the location of the special LI value.

18. The method of claim 10, wherein the remaining ready timer value of the RLC data block comprises binary coded bits representing the remaining time units of the READY timer and additional bits defining a time unit applicable to the remaining time units of the READY timer.

19. The method of claim 18, wherein the remaining ready timer value of the RLC data block is 8 bits long, with 6 binary coded bits representing the remaining time units of the READY timer and 2 additional bits defining the time unit applicable to the remaining time units of the READY timer.

20. The method of claim 10, further comprising the step of:
sending the cell update message comprising the NULL LLC PDU contained within the RLC data block to a serving GPRS support node, SGSN.

* * * * *